(12) United States Patent
Gholmieh et al.

(10) Patent No.: US 11,595,947 B2
(45) Date of Patent: Feb. 28, 2023

(54) ENHANCEMENTS FOR IMPROVED CV2X SCHEDULING AND PERFORMANCE

(71) Applicant: QUALCOMM INCORPORATED, San Diego, CA (US)

(72) Inventors: Ralph Akram Gholmieh, San Diego, CA (US); Hamza Ijaz Abbasi, San Diego, CA (US); Cheol Hee Park, San Diego, CA (US); Vaibhav Kumar Upadhyaya, Irvine, CA (US); Sundervelu Palanivelu Tandalam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/305,506

(22) Filed: Jul. 8, 2021

(65) Prior Publication Data

US 2022/0015068 A1    Jan. 13, 2022

Related U.S. Application Data

(60) Provisional application No. 63/049,961, filed on Jul. 9, 2020.

(51) Int. Cl.
*H04W 72/02* (2009.01)
*H04W 28/02* (2009.01)
(Continued)

(52) U.S. Cl.
CPC ....... *H04W 72/02* (2013.01); *H04W 28/0236* (2013.01); *H04W 72/048* (2013.01); *H04W 72/0446* (2013.01); *H04W 72/1268* (2013.01)

(58) Field of Classification Search
CPC ............. H04W 72/02; H04W 28/0236; H04W 72/0446; H04W 72/048; H04W 72/1268
See application file for complete search history.

(56) References Cited

U.S. PATENT DOCUMENTS

| | | | |
|---|---|---|---|
| 2017/0289733 A1* | 10/2017 | Rajagopal | H04W 4/70 |
| 2017/0374530 A1 | 12/2017 | Ramasamy | |
| 2020/0196321 A1* | 6/2020 | Zhang | G08G 1/005 |

OTHER PUBLICATIONS

Ericsson: "SPS Enhancements for Uu Operations in V2X," 3GPP Draft, 3GPP TSG-RAN WG2 #94, R2-164112-SPS Enhancements for UU Operations in V2X, 3RD Generation Partnership Project (3GPP), Mobile Competence Centre, 650, Route Des Lucioles, F-06921, Sophia-Antipolis Cedex, France, vol. RAN WG2, No. Nanjing, P.R. China, May 23, 2016-May 27, 2016, May 22, 2016 (May 22, 2016), XP051105429, 6 pages, Retrieved from the Internet: URL: http://www.3gpp.org/ftp/Meetings_3GPP_SYNC/RAN2/Docs/ [retrieved on May 22, 2016], the whole document.

(Continued)

*Primary Examiner* — Ayanah S George
(74) *Attorney, Agent, or Firm* — Dalei Dong; Haynes and Boone, LLP

(57) ABSTRACT

Various aspects of the present disclosure generally relate to wireless communication. In some aspects, techniques for improving semi-persistent scheduling performance, including in the context of cellular vehicle-to everything (CV2X) communications, are provided. For example, a method of wireless communication performed by a user equipment can include determining a first periodicity for transmitting safety messages, determining a second periodicity for transmitting the safety messages, wherein the second periodicity is different than the first periodicity, determining, based on a probabilistic determination process, whether to continue with the first periodicity or switch to the second periodicity, generating, based on the determination to continue with the first periodicity or switch to the second periodicity, the safety messages at the first periodicity or the second periodicity, and transmitting the safety messages at a same periodicity at which the safety messages were generated. Numerous other aspects are provided.

30 Claims, 21 Drawing Sheets

(51) Int. Cl.
     *H04W 72/04*      (2009.01)
     *H04W 72/12*      (2009.01)
     *H04W 72/0446*      (2023.01)
     *H04W 72/1268*      (2023.01)

(56) References Cited

OTHER PUBLICATIONS

International Search Report and Written Opinion—PCT/US2021/040975—ISA/EPO—Nov. 5, 2021.
LG Electronics Inc: "Support of Semi-Persistent Scheduling for PC5 mode 1," 3GPP Draft, 3GPP TSG-RAN2 Meeting #94, R2-164079 PC5 SPS Enhancements, 3RD Generation Partnership Project (3GPP), Mobile Competence Centre, 650, Route Des Lucioles, F-06921, Sophia-Antipolis Cedex, France, vol. RAN WG2, No. Nanjing, China, Apr. 11, 2016-Apr. 15, 2016, May 14, 2016 (May 14, 2016), XP051095292, 4 pages, Retrieved from the Internet: URL: http://www.3gpp.org/ftp/tsg_ran/WG2_RL2/TSGR2_94/Docs/ [retrieved on May 14, 2016] the whole document.

* cited by examiner

ENHANCEMENTS FOR IMPROVED CV2X SCHEDULING AND PERFORMANCE

CROSS-REFERENCE TO RELATED APPLICATIONS

The present application claims priority to and the benefit of U.S. Provisional Application No. 63/049,961, titled "ENHANCEMENTS FOR IMPROVED CV2X SCHEDULING AND PERFORMANCE." filed Jul. 9, 2020, which is hereby incorporated by reference in its entirety as if fully set forth below and for all applicable purposes.

TECHNICAL FIELD

Aspects of the present disclosure generally relate to wireless communication and to techniques for improving semi-persistent scheduling performance in terms of latency and probability of successful delivery, including in the context of cellular vehicle-to everything (CV2X) communications and/or congestion control algorithms.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

Aspects of the present disclosure are applicable to cellular vehicle-to everything (CV2X) communications, including vehicle-to-vehicle (V2V), vehicle-to-infrastructure (V2I), vehicle-to-pedestrian (V2P), and/or vehicle-to-cloud (V2C) communications. In some instances, decentralized congestion control (DCC) algorithms can be utilized to adjust communication parameters (semi-persistent scheduling (SPS) periodicity, message rates, data rates, transmission power, etc.) of CV2X communications. For example, aspects of the present disclosure can be used to improve the scheduling, performance, and efficiency of the DCC algorithms of the Society of Automotive Engineers International (SAE) and other DCC algorithms. In this regard, poor performance has been observed when DCC algorithms are implemented. The poor performance can be a result of sidelink control information (SCI) reservations not reflecting the actual usage of the devices. Accordingly, in some instances a device trying to reselect SPS resources, even at a moderate channel busy ratio (CBR) (e.g., 20-30%) in a congested area, may find a full usage map and select resources inefficiently. The enhancements and improvements of the present disclosure provide a significant gain in performance over the existing approaches.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of wireless communication performed by a user equipment includes determining a first periodicity for transmitting safety messages, determining a second periodicity for transmitting the safety messages, wherein the second periodicity is different than the first periodicity, determining, based on a probabilistic determination process, whether to continue with the first periodicity or switch to the second periodicity, generating, based on the determination to continue with the first periodicity or switch to the second periodicity, the safety messages at the first periodicity or the second periodicity, and transmitting the safety messages at a same periodicity at which the safety messages were generated.

In some aspects, a method of wireless communication performed by a user equipment, the method includes determining a first semi-persistent scheduling (SPS) periodicity for generating safety messages, determining a second SPS periodicity for generating the safety messages, the second SPS periodicity being greater than the first SPS periodicity, selecting a random time offset, and generating a first safety message associated with the second SPS periodicity based on the random time offset.

In some aspects, a user equipment comprises a processor configured to determine a first periodicity for transmitting safety messages, determine a second periodicity for transmitting the safety messages, wherein the second periodicity is different than the first periodicity, determine, based on a probabilistic determination process, whether to continue with the first periodicity or switch to the second periodicity, and generate, based on the determination to continue with the first periodicity or switch to the second periodicity, the safety messages at the first periodicity or the second periodicity, and a modem in communication with the processor, the modem configured to: transmit the safety messages at a same periodicity at which the safety messages were generated.

In some aspects, a user equipment comprises a processor configured to determine a first semi-persistent scheduling (SPS) periodicity for generating safety messages, determine a second SPS periodicity for generating the safety messages, the second SPS periodicity being greater than the first SPS periodicity, select a random time offset, and generate a first safety message associated with the second SPS periodicity based on the random time offset.

In some aspects, a user equipment comprises means for determining a first periodicity for transmitting safety messages, means for determining a second periodicity for transmitting the safety messages, wherein the second periodicity is different than the first periodicity, means for determining, based on a probabilistic determination process, whether to continue with the first periodicity or switch to the second periodicity, means for generating, based on the determination to continue with the first periodicity or switch to the second periodicity, the safety messages at the first periodicity or the second periodicity, and means for transmitting the safety messages at a same periodicity at which the safety messages were generated.

In some aspects, a user equipment comprises means for determining a first semi-persistent scheduling (SPS) periodicity for generating safety messages, means for determining a second SPS periodicity for generating the safety messages, the second SPS periodicity being greater than the first SPS periodicity, means for selecting a random time offset, and means for generating a first safety message associated with the second SPS periodicity based on the random time offset.

In some aspects, a non-transitory computer-readable medium having program code recorded thereon for wireless communication by a user equipment comprises code for causing the user equipment to determine a first periodicity for transmitting safety messages, code for causing the user equipment to determine a second periodicity for transmitting the safety messages, wherein the second periodicity is different than the first periodicity, code for causing the user equipment to determine, based on a probabilistic determination process, whether to continue with the first periodicity or switch to the second periodicity, code for causing the user equipment to generate, based on the determination to continue with the first periodicity or switch to the second periodicity, the safety messages at the first periodicity or the second periodicity, and code for causing the user equipment to transmit the safety messages at a same periodicity at which the safety messages were generated.

In some aspects, a non-transitory computer-readable medium having program code recorded thereon for wireless communication by a user equipment comprises code for causing the user equipment to determine a first semi-persistent scheduling (SPS) periodicity for generating safety messages, code for causing the user equipment to determine a second SPS periodicity for generating the safety messages, the second SPS periodicity being greater than the first SPS periodicity, code for causing the user equipment to select a random time offset, and code for causing the user equipment to generate a first safety message associated with the second SPS periodicity based on the random time offset.

The enhancements and improvements of the present disclosure provide a significant gain in performance over the existing approaches. In addition, many of the enhancements and improvements of the present disclosure can be applied to existing devices/systems without need for changes to the hardware and/or existing functionality of the devices/systems to realize the significant gain in performance. In this manner, many of the enhancements and improvements are backwards compatible with existing devices/systems.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
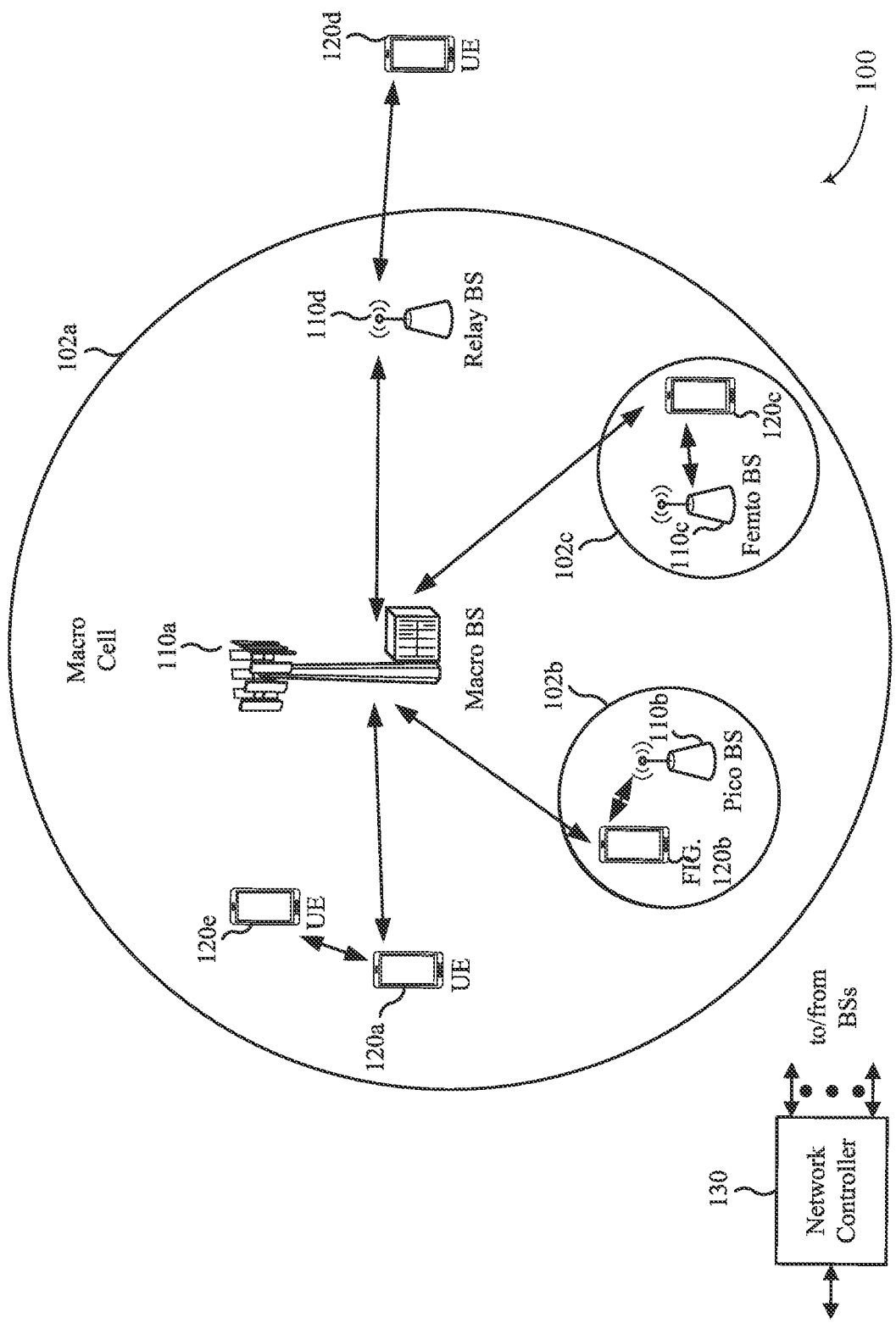
FIG. 1 illustrates a wireless communication network according to some aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, and/or a vehicle-to-cloud (V2C) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
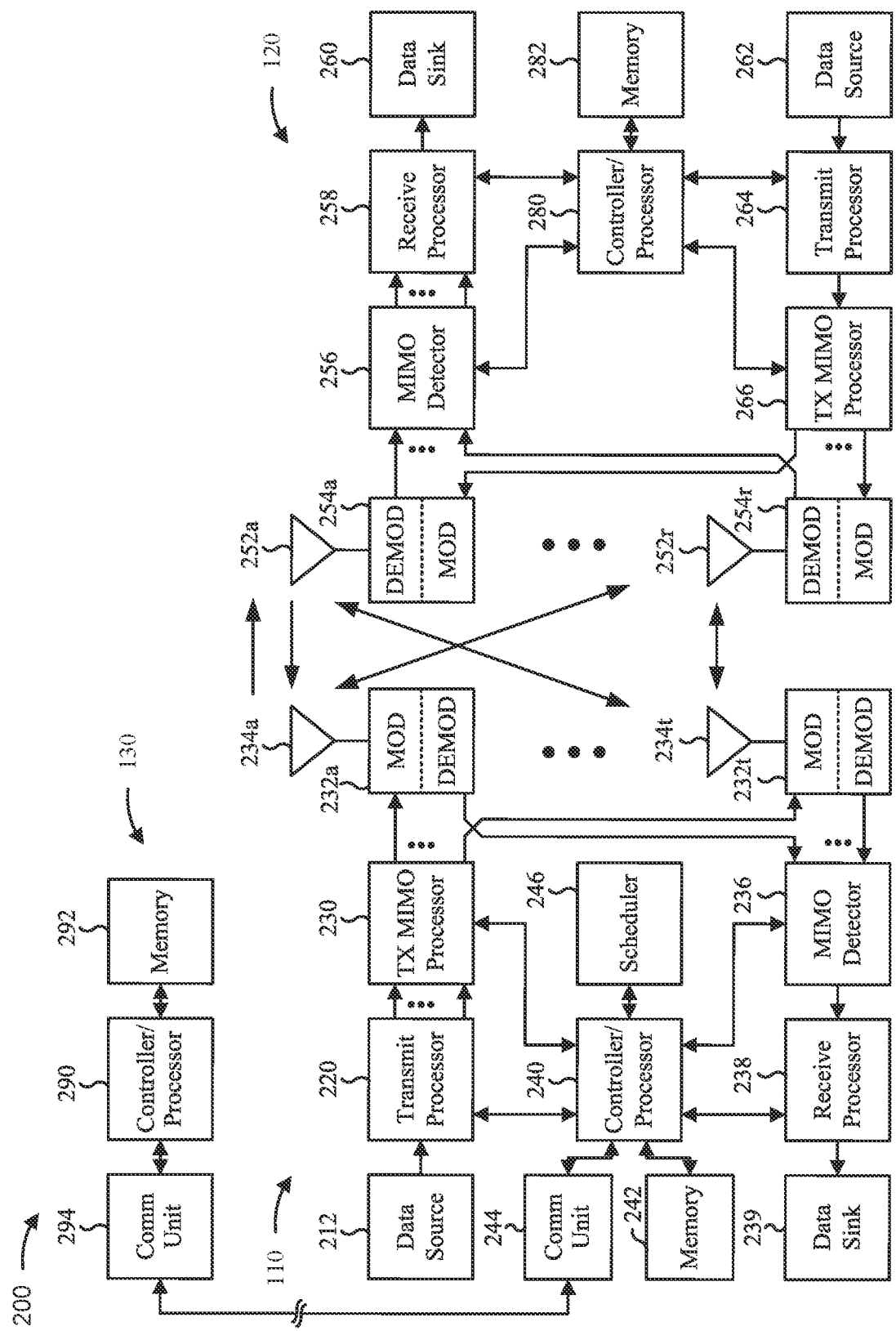
FIG. 2 illustrates an example of a base station in communication with a user equipment (UE) in a wireless communication network according to some aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At a base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and/or upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At a UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and/or digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reducing semi-persistent scheduling (SPS) latency, as described in more detail elsewhere herein. For example, controller/processor 240 of base station 110, controller/processor 280 of UE 120, and/or any other component(s) of FIG. 2 may perform or direct operations of, for example, process 800 of FIG. 8, methods 1800 and 1900 of FIGS. 18 and 19 respectively, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, methods 1800 and 1900 of FIGS. 18 and 19 respectively, and/or other processes as described herein. A scheduler 246 may schedule UEs for data transmission on the downlink and/or uplink, including sidelink communications.

In some aspects, UE 120 may include means for adjusting a basic safety message generation periodicity based at least in part on an SPS periodicity for transmitting basic safety messages, means for generating one or more basic safety messages based at least in part on the adjusted basic safety message generation periodicity, and/or the like. In some aspects, UE 120 may include means for receiving, from a modem of the UE 120 and at a processor of the UE 120 executing a safety application, an indication of an anchor time that is based at least in part on a resource selection for the safety application, means for generating, using the processor, a basic safety message of the one or more basic safety messages at an offset time prior to the anchor time, means for providing the basic safety message to the modem, and/or the like. In some aspects, UE 120 may include means for receiving, at a modem of the UE 120, an indication of a resource reselection associated with a safety application that is associated with the one or more basic safety messages, means for determining, using the modem, an updated anchor time based at least in part on the resource reselection, means for providing, from the modem and to a processor of the UE executing the safety application, an indication of the updated anchor time, and/or the like.

In some aspects, UE 120 may include means for receiving, from a modem of the UE 120 and at a processor of the UE executing a safety application, an indication of respective transmit times for each of the one or more basic safety messages, wherein the respective transmit times are based at least in part on a resource selection for the safety application and the SPS periodicity, means for generating, using the processor, the one or more basic safety messages at an offset time prior to the respective transmit times, and/or the like. In some aspects, UE 120 may include means for providing, using a processor of the UE 120 executing a safety application and to a modem of the UE 120, a request for an adjusted SPS periodicity, means for configuring, using the modem, the adjusted SPS periodicity at a reselection opportunity, means for receiving, using the processor, an indication of an anchor time for transmission of the one or more basic safety messages that is based at least in part on the adjusted SPS periodicity, and/or the like.

In some aspects, UE 120 may include means for providing, using a processor of the UE 120 executing a safety application and to a modem of the UE 120, a request for an adjusted SPS periodicity, means for configuring, using the modem, the adjusted SPS periodicity at a reselection opportunity, means for, until the reselection opportunity, transmitting any packets that do not fit into a reserved SPS transmission into non-SPS transmissions, and/or the like.

In some aspects, UE 120 may include means for determining a first periodicity for transmitting safety messages, means for determining a second periodicity for transmitting the safety messages, wherein the second periodicity is different than the first periodicity, means for determining, based on a probabilistic determination process, whether to continue with the first periodicity or switch to the second periodicity, means for generating, based on the determination to continue with the first periodicity or switch to the second periodicity, the safety messages at the first periodicity or the second periodicity, and/or means for transmitting the safety messages at a same periodicity at which the safety messages were generated.

In some aspects, UE 120 may include means for requesting, in response to determining to switch to the second periodicity, a modem of the user equipment to change to the second periodicity prior to sending, to the modem, a last safety message packet generated at the first periodicity.

In some instances, at least one of the means for determining the first periodicity or the means for determining the second periodicity includes means for rounding a safety message generation periodicity determined by a congestion control algorithm to the first supported SPS periodicity or the second supported SPS periodicity.

In some aspects, the UE 120 may include means for detecting a tracking error, and/or means for generating, based on the detected tracking error, a tracking error-based safety message separate from the plurality of supported SPS periodicities.

In some aspects, the UE 120 may include means for refraining from generating a safety message during a scheduled generation time period associated with the first periodicity or the second periodicity when the tracking error-based safety message is generated within a threshold amount of time of the scheduled generation time period.

In some aspects, the UE 120 may include means for generating a safety message during a scheduled generation time period when the tracking error-based safety message is generated within a threshold amount of time of the scheduled generation time period and the scheduled generation time period is associated with a change in periodicity.

In some aspects, the UE 120 may include means for determining a third periodicity for transmitting the safety messages, wherein the third periodicity is different than the first periodicity, means for determining, based on the probabilistic determination process, whether to continue with the first periodicity or switch to the third periodicity, and means for generating, based on the determination to continue with the first periodicity or switch to the third periodicity, the safety messages at the first periodicity or the third periodicity.

In some instances, the means for determining the first periodicity for transmitting the safety messages comprises means for rounding a first calculated periodicity to the first periodicity. The means for rounding the first calculated periodicity to the first periodicity may include means for rounding the first calculated periodicity to at least one of a supported SPS periodicity of a specification or a multiple of a 100-millisecond periodicity.

In some instances, the means for determining the second periodicity for transmitting the safety messages may include means for rounding a second calculated periodicity to the second periodicity. The means for rounding the second calculated periodicity to the second periodicity may include means for rounding the second calculated periodicity to the second periodicity based on a hysteresis parameter. In some aspects, the UE 120 may include means for randomly selecting a value for the hysteresis parameter from a set of available values for the hysteresis parameter. In some instances, the means for rounding the second calculated periodicity to the second periodicity based on a hysteresis parameter may include means for determining the second calculated periodicity is less than $(T_n+T_{n-1})/2-(T_n-T_{n-1})*H$ or greater than $(T_n+T_{n+1})/2+(T_{n+1}-T_n)*H$, where $T_n$ is the first periodicity, $T_{n-1}$ is a supported periodicity less than the first periodicity, $T_{n+1}$ is a supported periodicity greater than the first periodicity, and H is the hysteresis parameter.

In some instances, the means for determining whether to continue with the first periodicity or switch to the second periodicity is configured to operate at a scheduled packet generation time period associated with the first periodicity and prior to transmission of a packet generated at the scheduled packet generation time period.

In some aspects, the UE 120 may include means for determining a first semi-persistent scheduling (SPS) periodicity for generating safety messages, means for determining a second SPS periodicity for generating the safety messages, the second SPS periodicity being greater than the first SPS periodicity, means for selecting a random time offset, and/or means for generating a first safety message associated with the second SPS periodicity based on the random time offset.

In some instances, the means for selecting the random time offset may include means for randomly selecting a time between 0 and the second SPS periodicity.

In some instances, the means for generating the first safety message associated with the second SPS periodicity may include means for generating the first safety message after the random time offset from a current time if the random time offset is greater than or equal to a threshold value. In some instances, the means for generating the first safety message associated with the second SPS periodicity may further include means for generating the first safety message after the second SPS periodicity from the current time if the random time offset is less than the threshold value.

In some aspects, the UE 120 may include means for generating, following the first safety message, subsequent safety messages associated with the second SPS periodicity based on the second SPS periodicity.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a cellular V2X (C-V2X) deployment, UEs may communicate directly on a sidelink to share information (e.g., from a vehicle associated with a UE to any entity that may affect the vehicle, such as another vehicle, and vice versa). A safety application of a UE may share information with a safety application on another UE by transmitting a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. A basic safety message may include information about vehicle position, heading, speed, safety alerts, and other information relating to a vehicle's state and predicted path. Thus, UEs in a C-V2X deployment may transmit basic safety messages for purposes of autonomous travel, collision detection and avoidance, law enforcement and medical personnel message relaying, and/or the like.

A modem of a UE (e.g., a C-V2X modem or another type of modem) may unicast, broadcast, multicast, and/or the like a basic safety message to one or more other UEs. A safety application executed on a processor (e.g., an application processor or another type of processor) of the UE may generate basic safety messages in a semi-persistent manner (e.g., at a particular interval or basic safety message generation periodicity) and may provide the basic safety messages to the modem for transmission on a sidelink. The modem may packetize, encode, modulate, and/or otherwise process the basic safety messages for transmission.

The modem of the UE may schedule and/or reserve sidelink resources for transmission of basic safety messages at an SPS periodicity. These sidelink resources may be referred to as SPS resources, and may include time-domain resources (e.g., symbols, slots, subframes, and/or the like) and/or frequency-domain resources (e.g., resource elements, subcarriers, component carriers, and/or the like). In this case, an SPS resource for transmitting a basic safety message may occur for each SPS period. In some cases, the basic safety message generation periodicity of the processor executing the safety application and the SPS periodicity scheduled and/or reserved by the modem may result in inefficient use of SPS resources, may cause an increase in information age of basic safety messages, and/or the like. For example, a misalignment of the basic safety message generation periodicity and the SPS periodicity may result in an increased quantity of unused SPS sidelink resources (e.g., SPS sidelink resources that are skipped over for basic safety message transmission). As another example, the processor may generate a basic safety message too far in advance of an SPS resource for transmission of the basic safety message, which may increase the information age (the amount of time since the generation of the basic safety message) of the information included in the basic safety message. As the information age of the information included in the basic safety message increases, the information becomes stale, out-of-date, and/or less accurate. In some aspects, the SPS resource allocation may drift based on reserving subframes and/or allocating subframes to synchronization transmissions. In this case, the SPS reservation may be every 20, 50, 100, 200, or more logical subframes that do not include such reservation and thus the transmission time may drift from the generation time.

Some aspects described herein provide techniques and apparatuses for reducing semi-persistent scheduling latency in C-V2X and other sidelink-based deployments. In some aspects, a UE may align the basic safety message generation periodicity, and/or other types of messages that are sent periodically on an SPS flow, of a processor executing a safety application and an SPS periodicity for transmitting basic safety messages, and then align the generation times of the safety messages with the transmission times of the resources selected for SPS transmission such that information age of the basic safety messages is reduced and/or the quantity of unused SPS resources is reduced.

Moreover, the modem of the UE may provide the processor with an anchor time or transmit time, both of which may indicate a time at which a basic safety message is to be transmitted in an SPS resource. In this way, the processor may generate a basic safety message at an offset from the anchor time or transmit time in a manner that reduces the amount of time between generation and transmission of the basic safety message. This reduces the information age of the information included in the basic safety message, which prevents or reduces the likelihood that the information will become stale, out-of-date, or inaccurate. In some aspects, the processor and the modem of the UE may use other techniques to reduce information age and/or SPS scheduling latency, such as generating and transmitting non-SPS basic safety messages in scenarios in which an anchor time or transmit time is updated, scheduling an SPS resource within an SPS period in scenarios in which an anchor time or transmit time is updated, and/or the like.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an application specific integrated circuit (ASIC), and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity. For example, the processor may generate a basic safety message at an interval that occurs based at least in part on the basic safety message generation periodicity. In some aspects, the basic safety message generation periodicity may be selected based at least in part on congestion control in the wireless network (e.g., using a congestion control algorithm (e.g., the SAE DCC algorithms) and/or other techniques). The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

Figure 3:
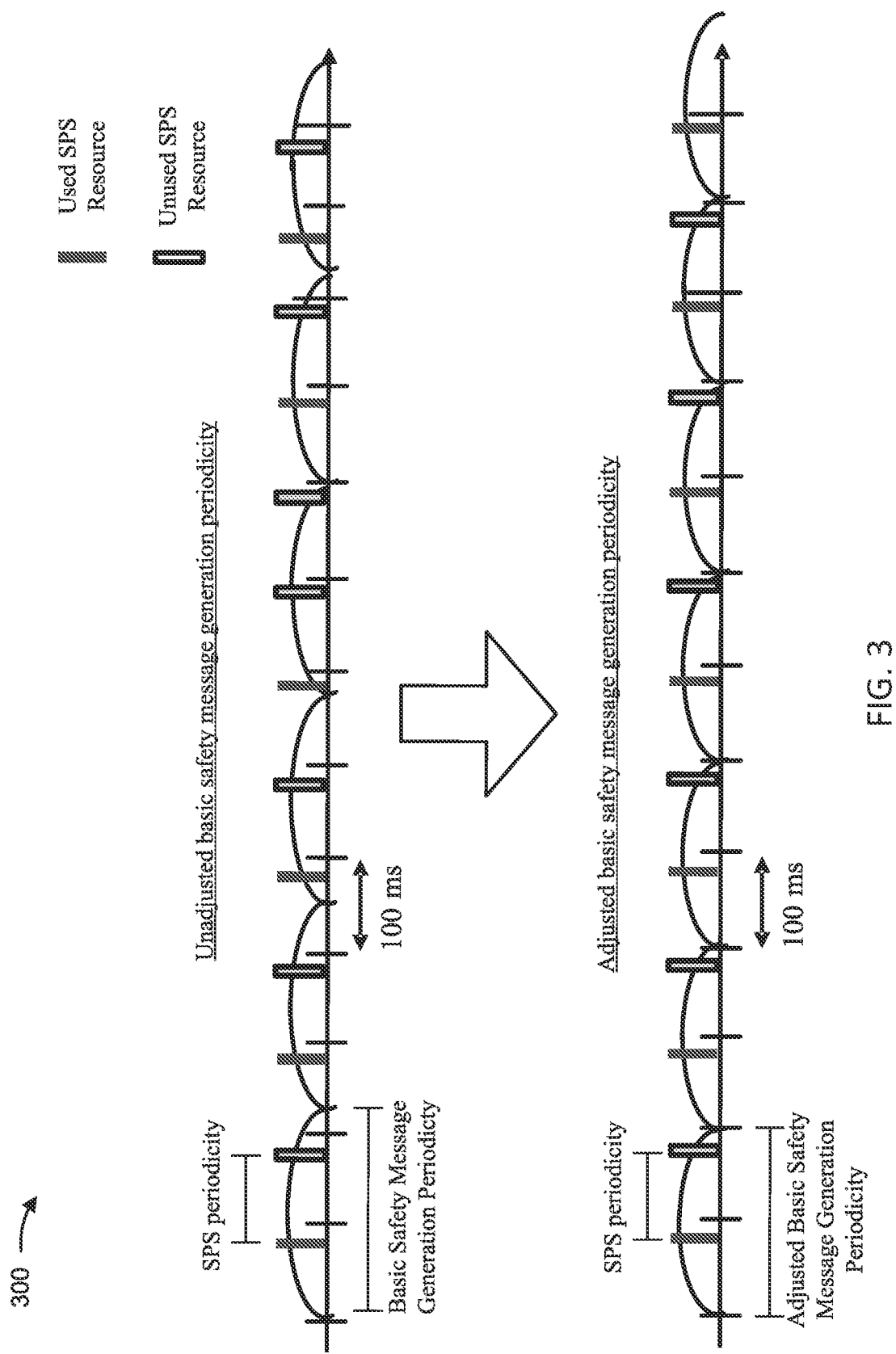
FIG. 3 illustrates an example of adjusting a basic safety message generation periodicity according to some aspects of the present disclosure.

FIG. 3 shows diagrams illustrating one or more examples 300 of adjusting a basic safety message generation periodicity, in accordance with various aspects of the present disclosure. As shown in FIG. 3, examples 300 may include a UE (e.g., UE 120). In some aspects, the UE may be deployed in a wireless network, such as wireless network 100.

Referring to FIG. 3, the UE (e.g., the processor executing the safety application) may adjust the basic safety message generation periodicity based at least in part on the SPS periodicity to reduce the quantity of unused SPS resources scheduled by the modem, and/or to align transmissions with the reserved periodicity thus reducing the information age, and/or to enable SPS reservations at greater than 100 ms since generation periodicities that are not aligned with SPS transmission times may require reservation periodicity that are no more than the allowed delay (e.g., 100 ms) because basic safety messages generated at drifting generation times relative to the reservation are to be served within the delay budget (e.g., 100 ms) from their delivery to the CV2X stack.

In some aspects, the UE may adjust the basic safety message generation periodicity such that the basic safety message generation periodicity is aligned with the SPS periodicity. For example, if the SPS periodicity indicates that an SPS resource occurs every 100 ms, the UE may adjust the basic safety message generation periodicity such that the processor generates a basic safety message every 100 ms.

In some aspects, the UE may adjust the basic safety message generation periodicity by rounding (e.g., wither up or down or to closest) the basic safety message generation periodicity to a multiple of the SPS periodicity. For example, if the SPS periodicity is 100 ms (e.g., an SPS resource occurs every 100 ms), and the basic safety message generation periodicity is 230 ms (e.g., a basic safety message is generated every 155 ms), the UE may round (up or down) the basic safety message generation periodicity to 100 ms or 200 ms. In some aspects, the UE may round the basic safety message generation periodicity to the nearest multiple of the SPS periodicity.

In some aspects, if the SPS periodicity is less than a threshold (e.g., 100 ms or another threshold), the UE may adjust the basic safety message generation periodicity by rounding up the basic safety message generation periodicity to the nearest multiple of the SPS periodicity. In some aspects, the UE may adjust the basic safety message generation periodicity by rounding (e.g., up or down) the basic safety message generation periodicity to the nearest basic safety message generation periodicity permitted for the UE (e.g., as indicated in a specification, a table, in signaling received by the UE, and/or the like).

In some aspects, the UE may adopt a strategy of either rounding to the closest target periodicity, round up to the closest target periodicity, or round down to closest target periodicity. Rounding down to the closest target periodicity may increase the load but ensures that safety messages are generated at least as frequently as in the non-rounding generator. Rounding to the closest target periodicity should ensure that the overall load in the system remains similar to the load in the case the non-rounding generator is used.

Rounding up may ensure a lower load in the system at the expense of slightly longer latencies.

The UE (e.g., the processor executing the safety application) may generate one or more basic safety messages based at least in part on the adjusted basic safety message generation periodicity. For example, the UE may generate a basic safety message at each interval of the basic safety message generation periodicity.

FIG. 3 illustrates an example of an unadjusted basic safety message generation periodicity and an adjusted basic safety message generation periodicity. Other examples of unadjusted basic safety message generation periodicities may be adjusted to basic safety message generation periodicities using the techniques described herein.

As shown in the upper portion of FIG. 3, an example unadjusted basic safety message generation periodicity may be about 230 ms. With an example SPS periodicity of 100 ms, a basic safety message is typically generated and transmitted every other SPS resource. However, in some cases, two SPS resources may go unused between basic safety message transmissions.

As further shown in the lower portion of FIG. 3, an example adjusted basic safety message generation periodicity may be about 200 ms. In this example, the unadjusted basic safety message generation periodicity was rounded down to a multiple of the 100 ms SPS periodicity, which eliminates the cases where two SPS resources are unused between basic safety message transmissions.

In this way, the UE may align the basic safety message generation periodicity of a processor executing a safety application and an SPS periodicity for transmitting basic safety messages such that information age of the basic safety messages is reduced, the quantity of unused SPS resources is reduced, and/or the like. In some instances, the UE may change the SPS reservation to 200 ms, thus liberating the intermediate resources for use by other devices.

As indicated above, FIG. 3 is provided as an example. Other examples may differ from what is described with respect to FIG. 3.

Figure 4:
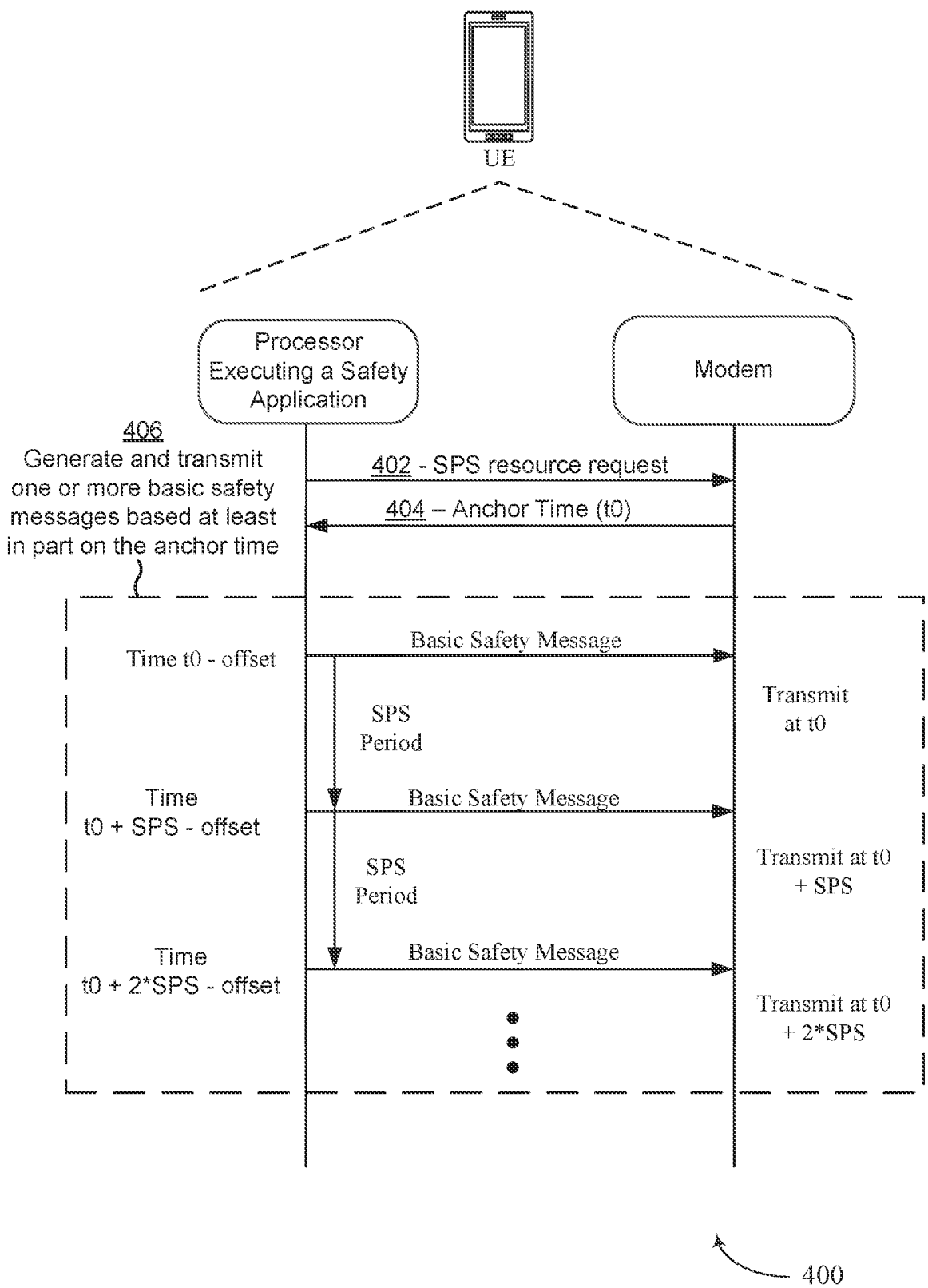
FIGS. 4, 5, and 6A-6C illustrate examples of reducing semi-persistent scheduling (SPS) latency according to some aspects of the present disclosure.

FIG. 4 is a flow diagram example 400 of reducing semi-persistent scheduling latency, in accordance with various aspects of the present disclosure. As shown in FIG. 4, example 400 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity, which may be adjusted using one or more of the techniques described above in connection with FIG. 3. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As shown in FIG. 4, and by reference number 402, in order to transmit basic safety messages, the processor executing the safety application may provide an SPS resource request to the modem to reserve, configure, or schedule SPS resources at an SPS periodicity. The modem may receive the request, and may reserve, configure, or schedule the SPS resources based at least in part on the SPS periodicity.

As further shown in FIG. 4, and by reference number 404, the modem may provide the processor with an indication of an anchor time (indicated in FIG. 4 as t0) that is based at least in part on the SPS resources. The anchor time may be a time at which a first basic safety message after an SPS resource reservation is configured or scheduled to be transmitted. Subsequent basic safety messages may be transmitted at SPS periods from the anchor time (e.g., at time t0+one SPS period, at time t0+two SPS periods, and so on).

As further shown in FIG. 4, and by reference number 406, the processor may receive the indication of the anchor time, and the UE may generate and transmit one or more basic safety messages based at least in part on the anchor time. In some aspects, the processor executing the safety application may generate the one or more basic safety messages based at least in part on an offset relative to the anchor time, based at least in part on the SPS periodicity, based at least in part on a basic safety message generation periodicity, and/or the like.

The offset time may be configured by the UE such that basic safety messages are generated as close to the time at which the basic safety messages are to be transmitted as possible to reduce or minimize information age of the basic safety messages. In some aspects, the offset may be based at least in part on a processing capability of the processor. For example, the offset time may be based on an amount of time the processor takes to generate basic safety messages.

As illustrated in FIG. 4, the processor may generate the first basic safety message at time t0−(minus) the offset and may provide the first basic safety message to the modem for transmission at t0. The processor may generate a second basic safety message at time t0+one SPS period−the offset and may provide the second basic safety message to the modem for transmission at time t0+one SPS period. The processor may generate a third basic safety message at time t0+two SPS periods−the offset and may provide the second basic safety message to the modem for transmission at time t0+two SPS periods. The processor may generate additional basic safety messages in a similar manner. In this way, each basic safety message is generated and transmitted according to the SPS periodicity starting from the anchor time.

In this way, the modem of the UE may provide the processor with an anchor time, which may indicate a time, based at least in part on an SPS periodicity, at which a basic safety message is to be transmitted in an SPS resource. In this way, the processor may generate a basic safety message at an offset from the anchor time in a manner that reduces the amount of time between generation and transmission of the basic safety message. This reduces the information age of the information included in the basic safety message, which prevents or reduces the likelihood that the information will become stale, out-of-date, or inaccurate.

As indicated above, FIG. 4 is provided as an example. Other examples may differ from what is described with respect to FIG. 4.

Figure 5:
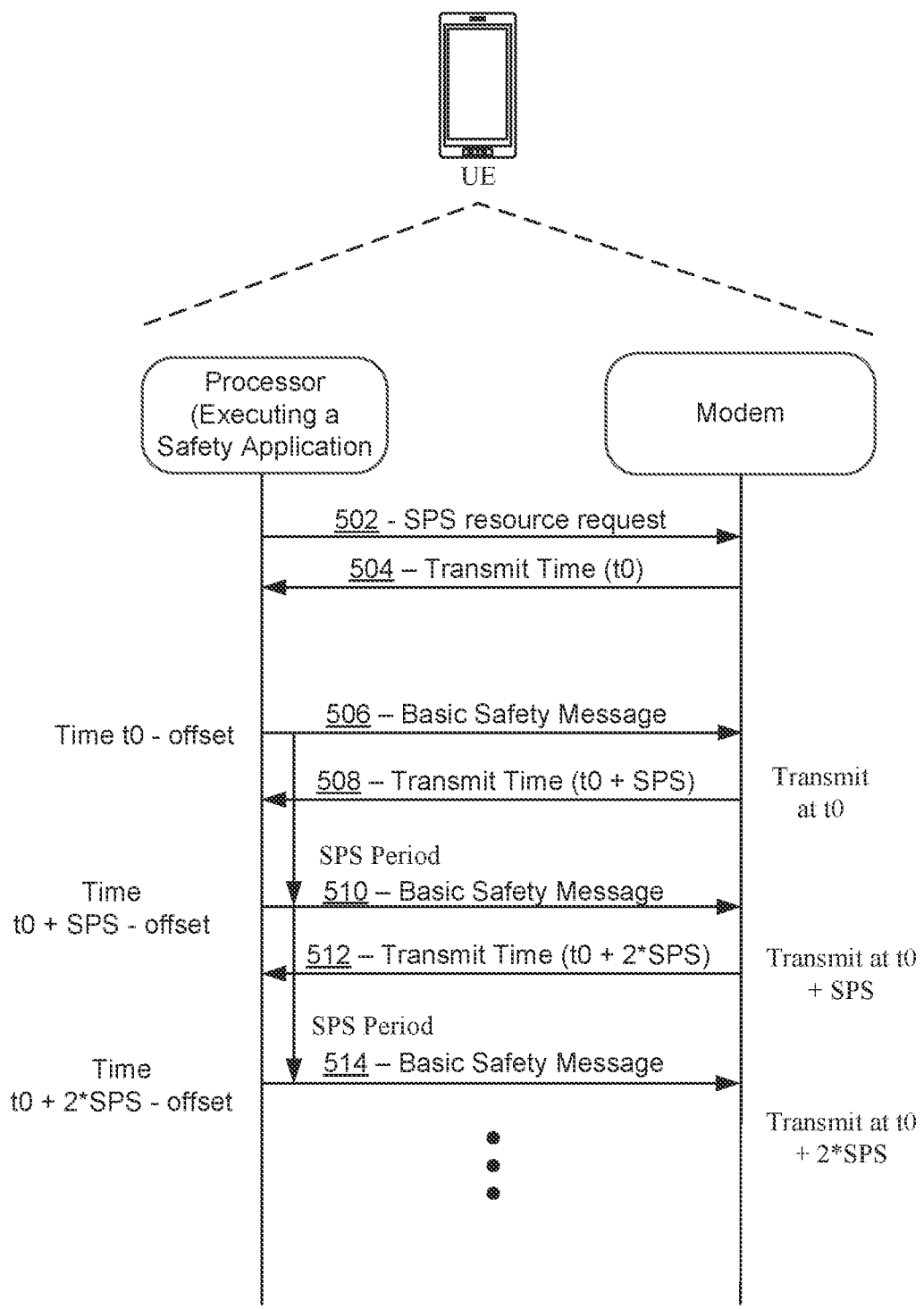

FIG. 5 is a flow diagram example 500 of reducing semi-persistent scheduling latency, in accordance with various aspects of the present disclosure. As shown in FIG. 5, example 500 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity, which may be adjusted using one or more of the techniques described above in connection with FIG. 3. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As shown in FIG. 5, and by reference number 502, in order to transmit basic safety messages, the processor executing the safety application may provide an SPS resource request to the modem to reserve, configure, or schedule SPS resources at an SPS periodicity. The modem may receive the request, and may reserve, configure, or schedule the SPS resources based at least in part on the SPS periodicity.

As further shown in FIG. 5, and by reference numbers 504-514, the modem may provide the processor with an indication of respective transmit times for each basic safety message that is to be generated by the processor. In some aspects, the transmit times may be based at least in part on the SPS periodicity, based at least in part on a basic safety message generation periodicity, and/or the like. The processor may generate a basic safety message for each provided transmit time and based at least in part on an offset.

As shown by reference number 504, the modem may provide the processor with an indication of a first time (indicated in FIG. 5 as t0) that is based at least in part on the SPS periodicity. The first transmit time may be a time at which a first basic safety message after the SPS resource reservation is configured or scheduled to be transmitted in a first SPS resource. As shown by reference number 506, processor may generate the first basic safety message based at least in part on the offset relative to the first transmit time (e.g., at time t0−the offset) and may provide the first basic safety message to the modem for transmission at t0.

As shown by reference number 506, the processor may generate the first basic safety message based at least in part on the offset relative to the first transmit time (e.g., at time t0−the offset) and may provide the first basic safety message to the modem for transmission at t0.

As shown by reference number 508, the modem may provide the processor with an indication of a second time (t0+one SPS period) that is based at least in part on the SPS periodicity. The second transmit time may be a time at which a second basic safety message at one SPS period after the SPS resource reservation is configured or scheduled to be transmitted in a second SPS resource.

As shown by reference number 510, the processor may generate the second basic safety message based at least in part on the offset relative to the second transmit time (e.g., at time t0+one SPS period−the offset) and may provide the second basic safety message to the modem for transmission at t0+one SPS period.

As shown by reference number 512, the modem may provide the processor with an indication of a third time (t0+two SPS periods) that is based at least in part on the SPS periodicity. The third transmit time may be a time at which a third basic safety message at two SPS periods after the SPS resource reservation is configured or scheduled to be transmitted in a third SPS resource.

As shown by reference number 514, the processor may generate the third basic safety message based at least in part on the offset relative to the third transmit time (e.g., at time t0+two SPS periods−the offset) and may provide the third basic safety message to the modem for transmission at t0+two SPS periods. The processor may generate subsequent basic safety messages based at least in part on the offset and transmit times in a similar manner as described above.

In this way, the modem of the UE may provide the processor with respective transmit times, each of which may indicate a time, based at least in part on an SPS periodicity, at which a basic safety message is to be transmitted in an SPS resource. In this way, the processor may generate a basic safety message at an offset from the transmit times in a manner that reduces the amount of time between generation and transmission of the basic safety message. This reduces the information age of the information included in the basic safety message, which prevents or reduces the likelihood that the information will become stale, out-of-date, or inaccurate.

As indicated above, FIG. 5 is provided as an example. Other examples may differ from what is described with respect to FIG. 5. Other examples may include a drift in the SPS transmission time, whereby the transmit time may be SPS plus or minus x ms. In some aspects, the message being transmitted may include any type of periodic message transmitted via a CV2X channel and/or a sidelink channel.

Figure 6A:
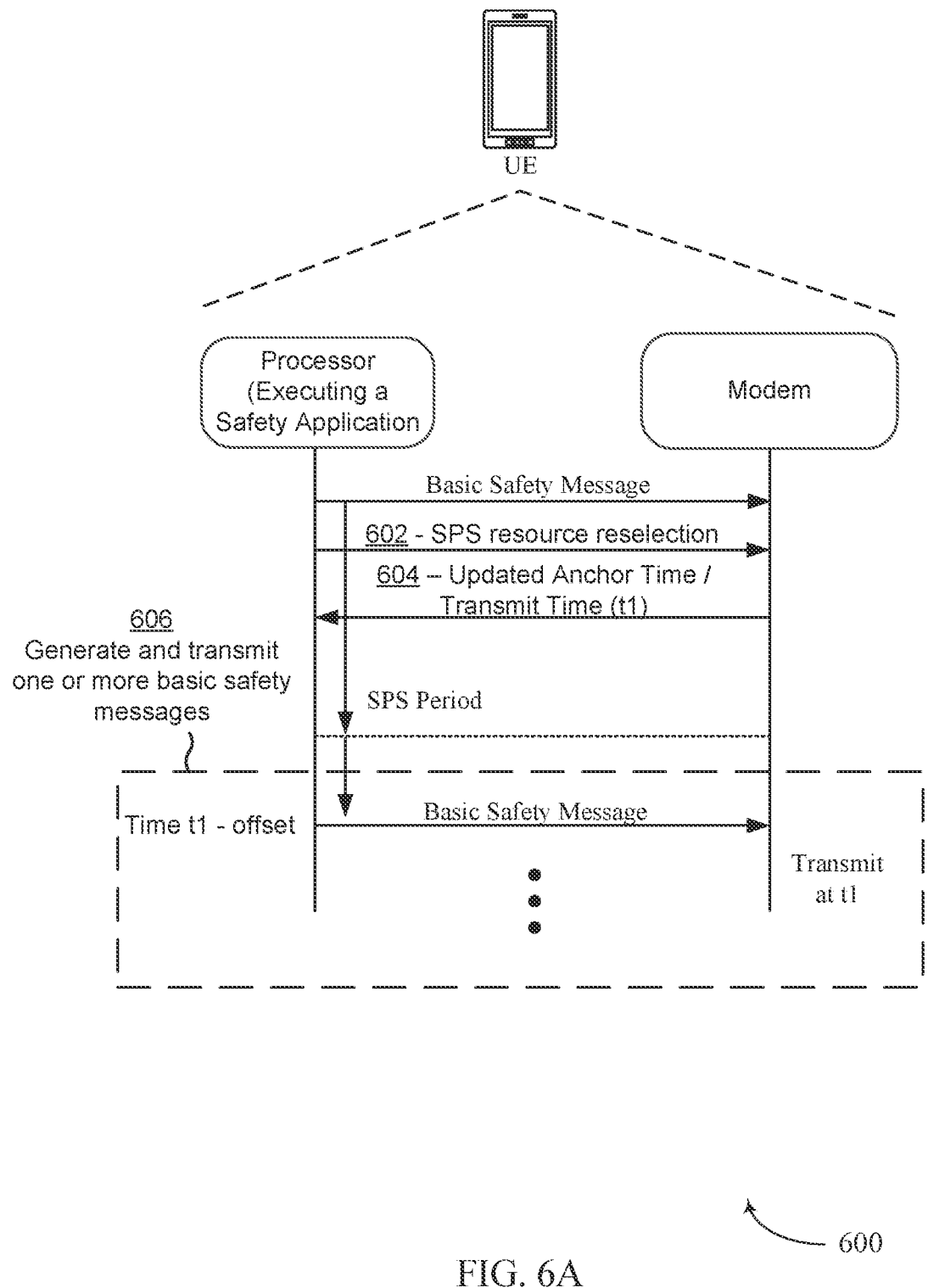
Figure 6B:
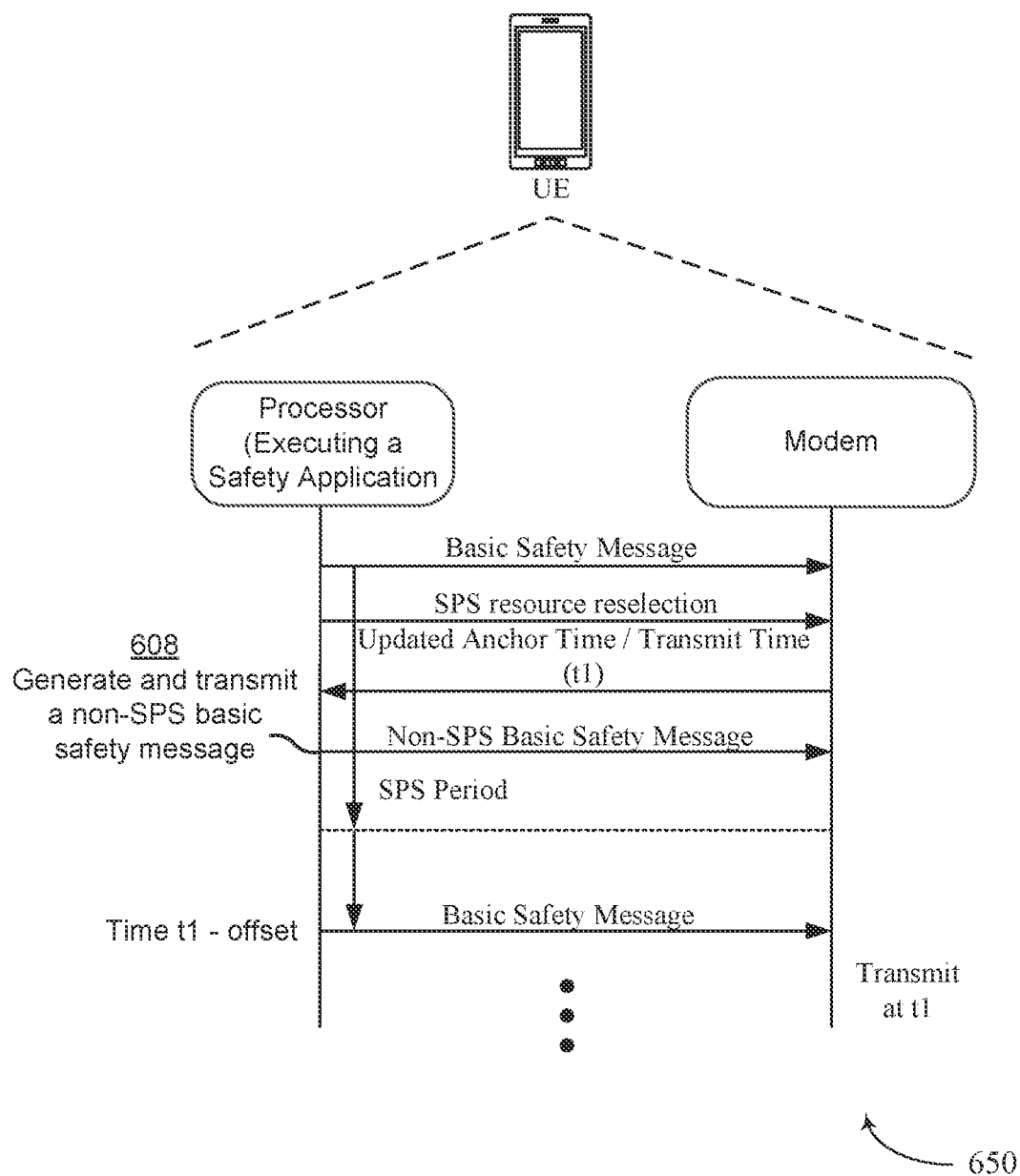
Figure 6C:
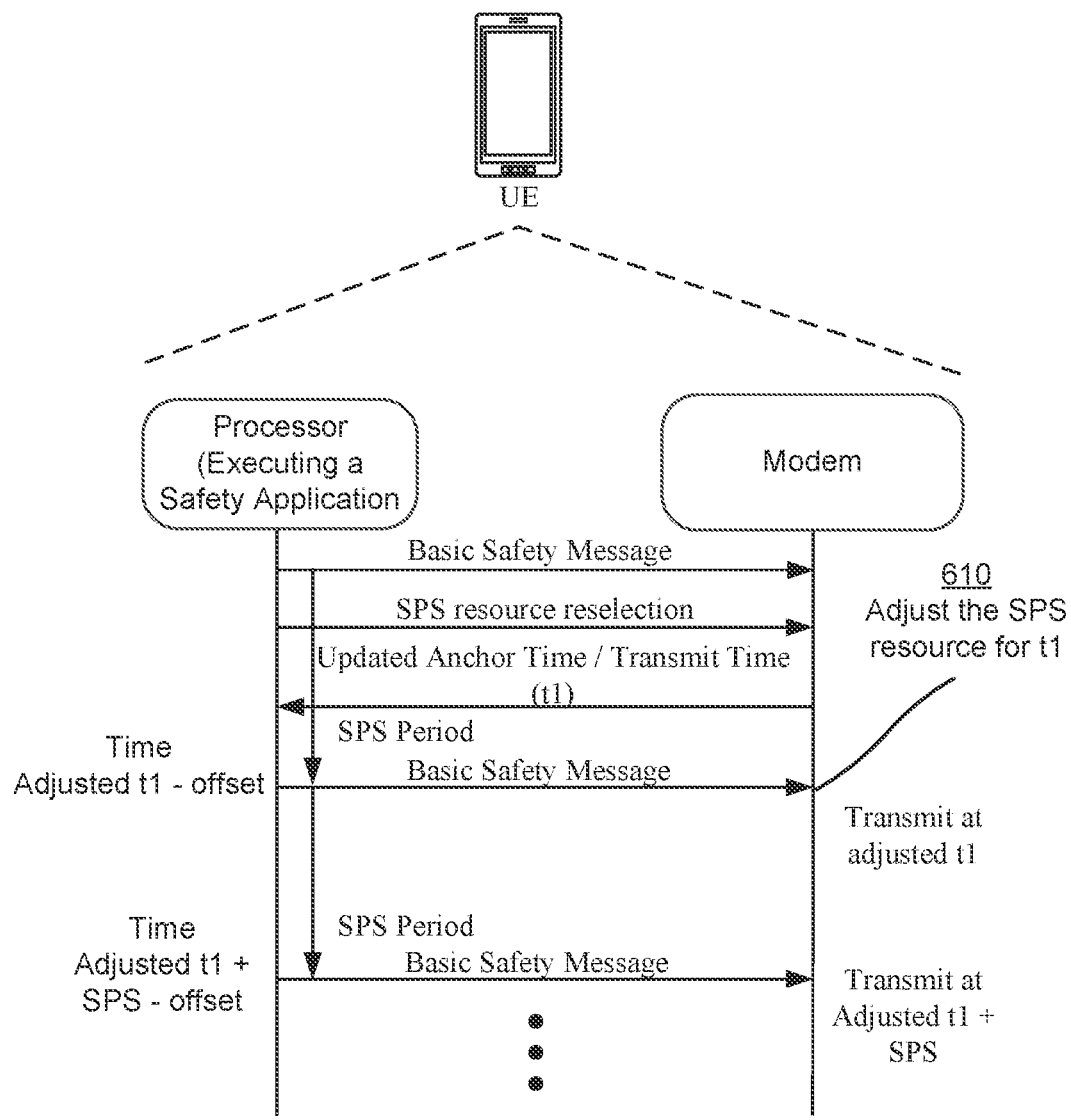

FIGS. 6A-6C are diagrams illustrating an example 600 of reducing semi-persistent scheduling latency, in accordance with various aspects of the present disclosure. As shown in FIGS. 6A-6C, example 600 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

As further shown in FIG. 6A, and by reference number 602, in some cases, the processor executing the safety application may periodically provide the modem with an SPS resource reselection request. In some aspects, the processor may request an SPS resource reselection based at least in part on an increased frequency for transmitting basic safety messages specified by the safety application, based at least in part on network congestion on the sidelink, and/or the like.

The modem may receive the SPS resource reselection request and may perform the SPS resource reselection based at least in part on receiving the request. In this case, the modem may select an updated set of SPS resources for basic safety message transmission and may select an updated anchor time or a new transmit time (indicated in FIG. 6A as t1) based at least in part on the SPS resource reselection. As shown by reference number 604, the modem may provide the processor with an indication of the updated anchor time or transmit time.

As further shown in FIG. 6A, and by reference number 606, the UE may generate and transmit one or more basic safety messages based at least in part on the updated anchor time or transmit time. For example, the processor may generate a basic safety message at an offset time relative to the updated anchor time or transmit time (e.g., at time t1−the offset) and may provide the basic safety message to the modem for transmission at time t1.

As further shown in FIG. 6A, in some cases, the updated anchor time or transmit time selected by the modem may result in the basic safety message being transmitted at a time that does not satisfy the SPS periodicity. In other words, the time between the transmission of the most recent basic safety message and the transmission of the basic safety message based at time t1 may be greater than the SPS periodicity, which may result in an increased information age of the information included in the basic safety message.

In some aspects, the UE may be permitted to transmit the basic safety message at t1 even though the transmission of the basic safety message at t1 does not satisfy the SPS periodicity due to the low and/or infrequent occurrence of basic safety messages that do not satisfy the SPS periodicity.

As shown in FIG. 6B, and by reference number 608, in some aspects, the UE may be capable of mitigating a transmission of the basic safety message at time t1 that does not satisfy the SPS periodicity by transmitting a non-SPS basic safety message (which may also be referred to as a one-shot intermediate basic safety message) between the transmission of the most recent basic safety message and the transmission of the basic safety message at time t1. For example, the processor may determine that transmission of the basic safety message at time t1 will not satisfy the SPS periodicity and may generate the non-SPS basic safety message to satisfy the SPS periodicity based at least in part on the determination. In this way, the non-SPS basic safety message may be transmitted within the SPS period from the transmission of the most recent basic safety message, which satisfies the SPS periodicity. Subsequent basic safety messages may be transmitted based at least in part on the SPS periodicity at time t1 and so on.

In some aspects, the modem may instruct the processor to generate the non-SPS basic safety message such that the non-SPS basic safety message is to be transmitted within a threshold range associated with transmission of the basic safety message at time t1. For example, the modem may instruct the processor to generate the non-SPS basic safety message such that the non-SPS basic safety message is to be transmitted within ±50 ms from t1. In another aspect, the modem may select resources within t1 to t2 from the time of decision to reselect, where t1 is generally about 4 ms, and t2 varies depending on the detected load on the channel and may be less than the delay budget which has been assumed to be 100 ms in the preceding description. Thus, by choosing the reselection time at t1−(t2−t1)/2−t1, the modem can ensure that the transmission time will be between +/−(t2−t1)/2 from t1.

In some aspects, the use of the non-SPS basic safety message may still result in the transmission of the basic safety message at time t1 not satisfying the SPS periodicity. In other words, the time between transmission of the non-SPS basic safety message and the transmission of the basic safety message at time t1 may still exceed the SPS periodicity. In these examples, the processor may generate another non-SPS basic safety message based at least in part on the determination that the transmission of the non-SPS basic safety message will result in the amount of time between transmission of the non-SPS time and transmission of the basic safety message at time t1 to exceed the SPS periodicity. In some aspects, the processor may generate further non-SPS basic safety messages as needed to satisfy the SPS periodicity.

In some aspects, the modem may autonomously generate and transmit the non-SPS basic safety messages (e.g., without input from the processor) such that the process of transmitting the non-SPS basic safety messages is transparent to the processor.

As shown in FIG. 6C, and by reference number 610, in some aspects, the UE may be capable of mitigating the transmission of the basic safety message at time t1 that does not satisfy the SPS periodicity by adjusting the selection of the SPS resource for the basic safety message. In these examples, the modem may adjust the selection of the SPS resource such that time t1 occurs earlier in time and within the SPS period from the most recent basic safety message transmission such that the SPS periodicity is satisfied.

As further shown in FIG. 6C, subsequent basic safety messages may be generated and transmitted at SPS periods relative to the adjusted time t1. For example, the processor may generate a subsequent basic safety message at the offset value relative to the adjusted time t1+one SPS period and may provide the subsequent basic safety message to the modem for transmission at adjusted time t1+one SPS period.

In this way, the processor and the modem of the UE may use one or more techniques described above to reduce information age and/or SPS scheduling latency, such as generating and transmitting non-SPS basic safety messages in scenarios in which an anchor time or transmit time is updated, scheduling an SPS resource within an SPS period in scenarios in which an anchor time or transmit time is updated, and/or the like.

As indicated above, FIGS. 6A-6C are provided as one or more examples. Other examples may differ from what is described with respect to FIGS. 6A-6C.

Figure 7:
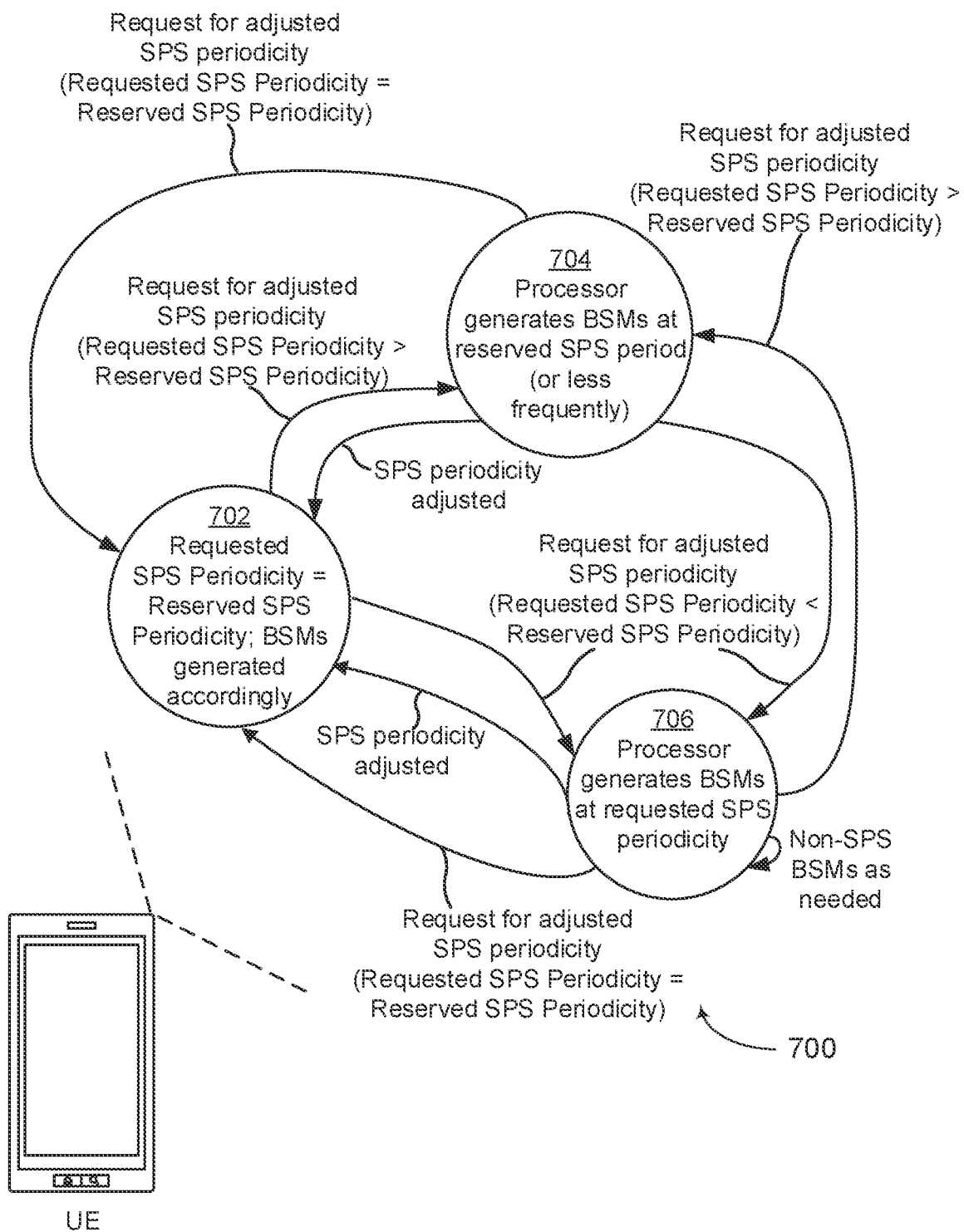
FIG. 7 illustrates an example of adjusting an SPS periodicity according to some aspects of the present disclosure.

FIG. 7 is a state diagram illustrating an example 700 of reducing semi-persistent scheduling latency, in accordance with various aspects of the present disclosure. As shown in FIG. 7, example 700 may include a UE (e.g., UE 120). In some aspects, the UE may be deployed in a wireless network, such as wireless network 100.

In some aspects, the UE may be deployed in a C-V2X deployment or another type of deployment in which the UE communicates with other UEs on a sidelink. In this case, the UE may include a processor (e.g., a controller/processor 280) and a memory (e.g., memory 282) which may store and execute a safety application. The processor may generate basic safety messages for the safety application and may provide the basic safety messages to a modem of the UE.

The modem of the UE may be implemented by a receive processor (e.g., receive processor 258), a transmit processor (e.g., transmit processor 264), a controller/processor (e.g., controller/processor 280), a memory (e.g., memory 282), a modem component that includes one or more of a receive processor, a transmit processor, a controller/processor, a memory, an integrated circuit, an ASIC, and/or the like. The modem may be capable of packetizing the basic safety messages, encoding packets, modulating the encoded packets, and/or performing other baseband processing of the basic safety messages for transmission on the sidelink.

In some aspects, the processor executing the safety application may generate basic safety messages based at least in part on a basic safety message generation periodicity, which may be adjusted using one or more of the techniques described above in connection with FIG. 3. For example, the processor may generate a basic safety message at an interval that occurs based at least in part on the basic safety message generation periodicity. The modem may reserve or schedule SPS resources on the sidelink for transmission of the basic safety messages. In some aspects, the modem may reserve or schedule the SPS resources such that the SPS resources occur based at least in part on an SPS periodicity, where each SPS resource occurs at an interval that is based at least in part on the SPS periodicity.

In some aspects, the modem and/or the processor may adjust the SPS periodicity (e.g., based at least in part on an expected change to the basic safety message generation periodicity for the safety application, based at least in part on sidelink and/or network congestion, and/or the like). For example, the processor may request an SPS periodicity that is greater than the reserved SPS periodicity for the safety application. As another example, the processor may request an SPS periodicity that is less than the reserved SPS periodicity for the safety application. The modem may receive the request to adjust the SPS periodicity and may adjust the SPS periodicity at the next reselection opportunity, which may occur at particular times or at particular intervals in the wireless network. Example 700 of FIG. 7 may illustrate various operating states and state transitions for adjusting an SPS periodicity.

As shown in FIG. 7, state 702 corresponds to a state of the UE where the SPS periodicity reserved by the modem is set to or equal to the SPS periodicity requested by the processor executing the safety application. In state 702, the processor may generate basic safety messages according to the reserved SPS periodicity.

As further shown in FIG. 7, state 704 corresponds to a state of the UE where the SPS periodicity requested by the processor is greater than the SPS periodicity reserved by the modem. In some aspects, the UE may transition to state 704 from state 702 or state 706 based at least in part on the processor providing the modem with a request for an adjusted SPS periodicity that is greater than the SPS periodicity reserved by the modem.

In state 704, the processor may generate basic safety messages at the reserved SPS periodicity or less frequently until the modem provides the processor with an indication that the reserved SPS periodicity has been adjusted to match the requested SPS periodicity (in which case the UE may transition to state 702), until the processor provides the modem with a request for an adjusted SPS periodicity that matches the reserved SPS periodicity (in which case the UE may transition to state 702), or until the processor provides the modem with a request for an adjusted SPS periodicity that is less than the reserved SPS periodicity (in which case the UE may transition to state 702). In some aspects, when adjusting the reserved SPS periodicity to a greater periodicity, the modem may change the selection at a time of arrival of the latest basic safety message arrival to avoid out of phase transmissions.

As further shown in FIG. 7, state 706 corresponds to a state of the UE where the SPS periodicity requested by the processor is less than the SPS periodicity reserved by the modem. In some aspects, the UE may transition to state 706 from state 702 or state 704 based at least in part on the processor providing the modem with a request for an adjusted SPS periodicity that is less than the SPS periodicity reserved by the modem.

In state 706, the processor may generate basic safety messages at the requested SPS periodicity until the modem provides the processor with an indication that the reserved SPS periodicity has been adjusted to match the requested SPS periodicity (in which case the UE may transition to state 702), until the processor provides the modem with a request for an adjusted SPS periodicity that matches the reserved SPS periodicity (in which case the UE may transition to state 702), or until the processor provides the modem with a request for an adjusted SPS periodicity that is greater than the reserved SPS periodicity (in which case the UE may transition to state 704).

Moreover, while the UE is in state 706, the modem may transmit non-SPS basic safety messages as needed in order for the UE to transmit basic safety messages at the requested SPS periodicity. In these examples, the modem may generate and transmit the non-SPS basic safety messages without input from the processor.

In this way, the processor and the modem of the UE may adjust the SPS periodicity for transmitting basic safety messages, may adjust the generation of basic safety messages to accommodate the SPS periodicity adjustments, and/or the like.

As indicated above, FIG. 7 is provided as an example. Other examples may differ from what is described with respect to FIG. 7.

For example, in some aspects, the processor may always reserve the SPS flow periodicity and generate packets using the same periodicity value. The periodicity may be determined and updated by the processor using a congestion control algorithm (e.g., a society of automotive engineers (SAE) specified congestion control algorithm and/or another type of congestion control algorithm). However, on a request to change the flow periodicity, the modem may delay the change in the SPS reservation and may maintain the reservation until the next reselection. Until the next reselection, there will be a mismatch between the actual safety message generation periodicity at the safety application, and the actual SPS periodicity reserved for transmission. Until the modem SPS reservation is updated to match the requested SPS reservation (which is equal to the safety application message generation periodicity), any packet received for transmission that does not arrive within the delay budget from the net transmission opportunity is sent as non-SPS or single shot transmission.

In some aspects, as a variant of the above alternative, the modem may determine to delay the periodicity change until the next reservation if the periodicity is decreased, but change the reservation immediately, or after a short delay, if the periodicity is decreased.

Figure 8:
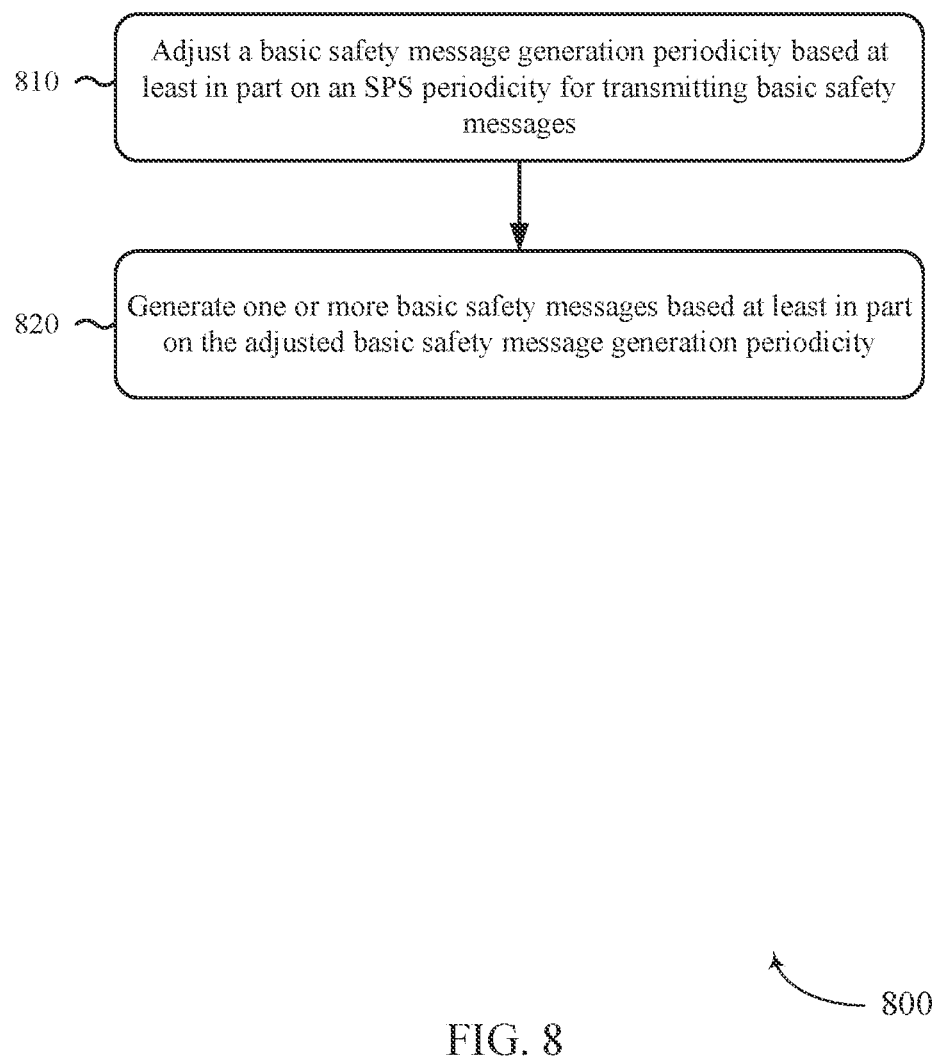
FIG. 8 illustrates an example process to adjust a safety message generation periodicity according to some aspects of the present disclosure

FIG. 8 is a diagram illustrating an example process 800 performed, for example, by a UE, in accordance with various aspects of the present disclosure. Example process 800 is an example where the UE (e.g., UE 120 illustrated and described in connection with FIGS. 1 and 2, the UE illustrated and described in connection with FIGS. 3, 4, 5, 6A-6C, and/or 7) performs operations associated with reducing semi-persistent scheduling latency.

As shown in FIG. 8, in some aspects, process 800 may include adjusting a basic safety message generation periodicity based at least in part on an SPS periodicity for transmitting basic safety messages (block 810). For example, the UE (e.g., using receive processor 258, transmit processor 264, controller/processor 280, memory 282, and/or the like) may adjust a basic safety message generation periodicity based at least in part on an SPS periodicity for transmitting basic safety messages, as described above.

As further shown in FIG. 8, in some aspects, process 800 may include generating one or more basic safety messages based at least in part on the adjusted basic safety message generation periodicity (block 820). For example, the UE (e.g., using receive processor 258, transmit processor 264, controller/processor 280, memory 282, and/or the like) may generate one or more basic safety messages based at least in part on the adjusted basic safety message generation periodicity, as described above.

Process 800 may include additional aspects, such as any single aspect or any combination of aspects described below and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
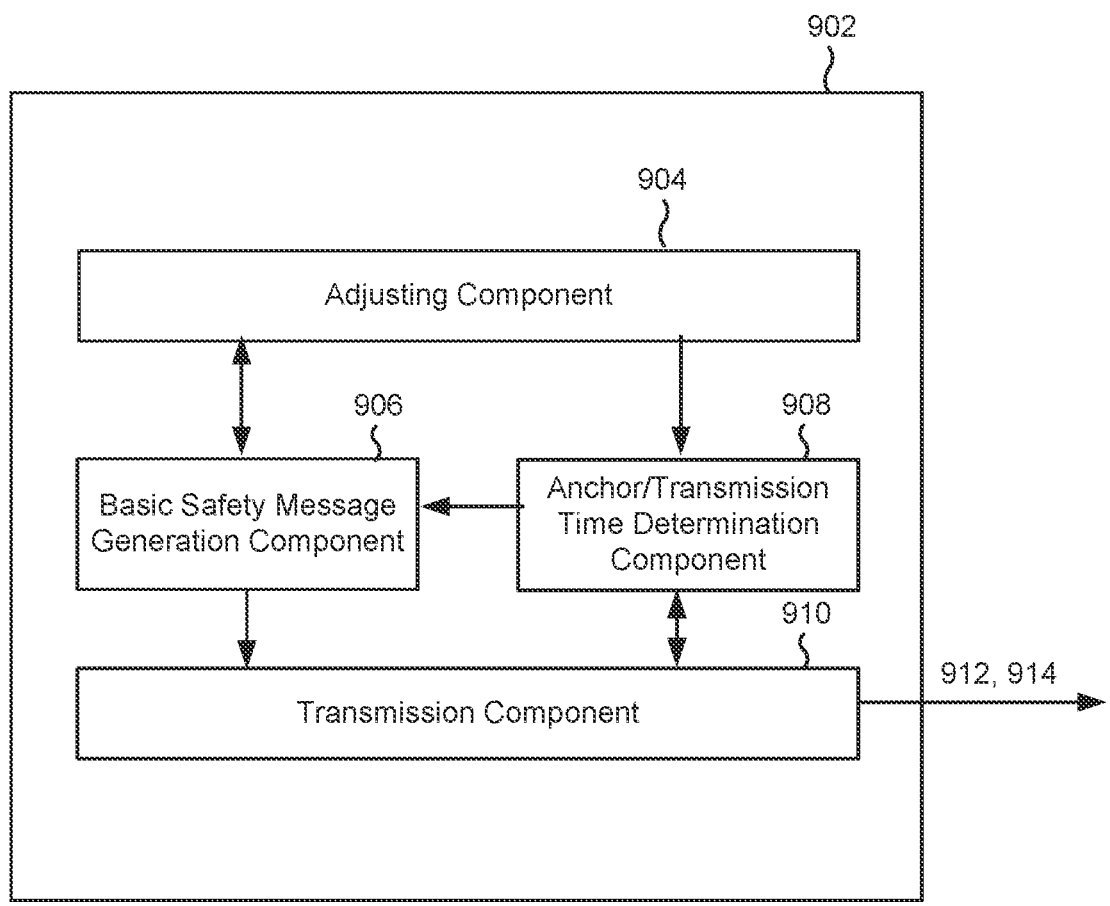
FIG. 9 illustrates a data flow between different components in an example apparatus according to some aspects of the present disclosure.

FIG. 9 is a data flow diagram 900 illustrating a data flow between different components in an example apparatus 902. The apparatus 902 may be a UE (e.g., UE 120 illustrated and described in connection with FIGS. 1 and 2, the UEs illustrated and described in connection with FIGS. 3, 4, 5, 6A-6C, 7, 8, and/or 10). In some aspects, the apparatus 902 includes a determining/adjusting component 904, a basic safety message generation component 906, an anchor/transmission time determination component 908, and a transmission component 910.

In some aspects, the determining/adjusting component 904 may determine and/or adjust a basic safety message generation periodicity in accordance with aspects of FIGS. 3-8 and 11-19. In some aspects, basic safety message generation component 906 may generate one or more basic safety messages 912 based at least in part on the basic safety message generation periodicity as determined/adjusted by determining/adjusting component 904. In some aspects, basic safety message generation component 906 may provide the one or more basic safety messages 912 to transmission component 910, and transmission component 910 may transmit the one or more basic safety messages 912.

In some aspects, anchor/transmission time determination component 908 may determine an anchor time and may provide an indication of the anchor time to basic safety message generation component 906. In some aspects, the anchor time may be based at least in part on a resource selection for a safety application associated with the apparatus 902. In some aspects, basic safety message generation component 906 may receive an indication of the anchor time and may generate a basic safety message 912 at an offset time prior to the anchor time.

In some aspects, anchor/transmission time determination component 908 may receive an indication of a resource reselection associated with the safety application that is associated with the one or more basic safety messages 912, may determine an updated anchor time based at least in part on the resource reselection, and may provide an indication of the updated anchor time to basic safety message generation component 906. In some aspects, basic safety message generation component 906 may generate a basic safety message of the one or more basic safety messages at an offset time prior to the updated anchor time. In some aspects, basic safety message generation component 906 may generate a non-SPS basic safety message 914 based at least in part on the determination that the transmission of a basic safety message 912 at the updated anchor time will result in the amount of time between the updated anchor time and the time at which the basic safety message 912 most recently generated by the basic safety message generation component 906 is to be transmitted exceeds the SPS periodicity.

In some aspects, transmission component 910 may use a resource prior to the updated anchor time for transmission of a basic safety message 912 based at least in part on the determination that the transmission of the basic safety message 912 at the updated anchor time will result in the amount of time between the updated anchor time and the time at which the a basic safety message 912 most recently generated by the basic safety message generation component 906 is to be transmitted exceeds the SPS periodicity.

In some aspects, anchor/transmission time determination component 908 may determine respective transmit times for each of the one or more basic safety messages 912 and may provide an indication of the respective transmit times to the basic safety message generation component 906. In some aspects, the basic safety message generation component 906 may generate the one or more basic safety messages 912 at an offset time prior to the respective transmit times.

In some aspects, the basic safety message generation component 906 may provide, to the determining/adjusting component 904, a request for an adjusted SPS periodicity. The determining/adjusting component 904 may receive the request, may configure the determined/adjusted SPS periodicity at a reselection opportunity, and may provide an indication of an anchor time to the basic safety message generation component 906 for transmission of the one or more basic safety messages 912 that is based at least in part on the determined/adjusted SPS periodicity. In some aspects, the basic safety message generation component 906 may generate the one or more basic safety messages 912 based at least in part on the SPS periodicity prior to the basic safety message generation component 906 receiving the adjusted SPS periodicity.

In some aspects, the determining/adjusting component 904 may include a receive processor (e.g., receive processor 258), a transmit processor (e.g., transmit processor 264), a controller/processor (e.g., controller/processor 280), a memory (e.g., memory 282), a modem of the apparatus 902 (e.g., implemented by one or more of the receive processor, the transmit processor, the controller/processor, and/or the memory), and/or the like. In some aspects, the basic safety message generation component 906 may include a receive processor (e.g., receive processor 258), a transmit processor (e.g., transmit processor 264), a controller/processor (e.g., controller/processor 280), a memory (e.g., memory 282), a modem of the apparatus 902 (e.g., implemented by one or more of the receive processor, the transmit processor, the controller/processor, and/or the memory), and/or the like. In some aspects, the anchor/transmission time determination component 908 may include a receive processor (e.g., receive processor 258), a transmit processor (e.g., transmit processor 264), a controller/processor (e.g., controller/processor 280), a memory (e.g., memory 282), a modem of the apparatus 902 (e.g., implemented by one or more of the receive processor, the transmit processor, the controller/processor, and/or the memory), and/or the like. In some aspects, the transmission component 910 may include a transmit processor (e.g., transmit processor 264), a controller/processor (e.g., controller/processor 280), a memory (e.g., memory 282), a modem of the apparatus 902 (e.g., implemented by one or more of the receive processor, the transmit processor, the controller/processor, and/or the memory), and/or the like.

The apparatus 902 may include additional components that perform aspects of FIGS. 3-8 and 11-19 and/or the like. Each block of the algorithms or other aspects of FIGS. 3-8 and 11-19 and/or the like may be performed by a component or combination of components and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
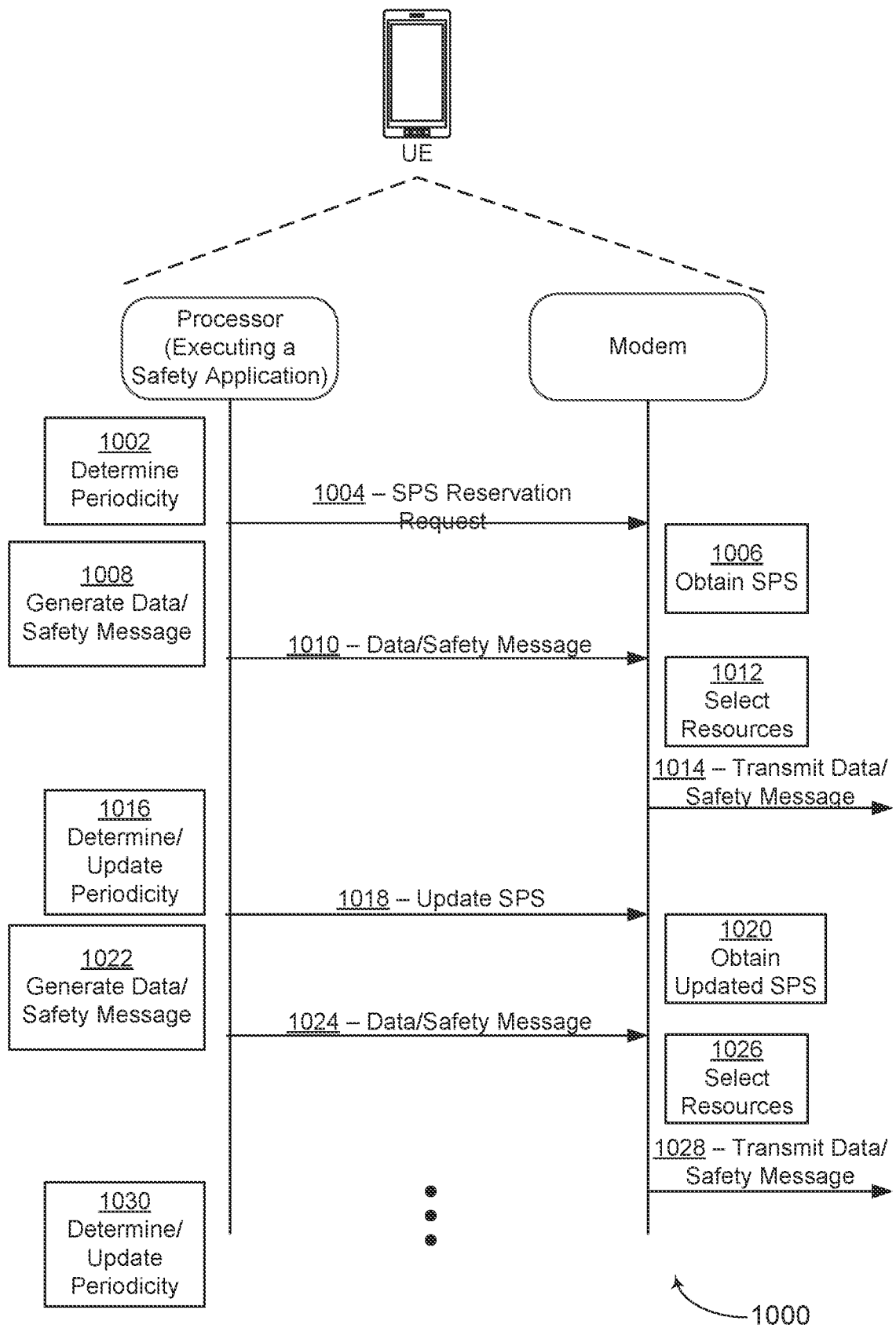
FIG. 10 illustrates a signaling diagram of a SPS scheduling process according to some aspects of the present disclosure.

FIG. 10 is a signaling diagram of a SPS scheduling process 1000, in accordance with various aspects of the present disclosure. As shown, aspects of the SPS scheduling process 1000 may be performed by a UE (e.g., UE 120 illustrated and described in connection with FIGS. 1 and 2, the UEs illustrated and described in connection with FIGS. 3, 4, 5, 6A-6C, 7, and 9). In this regard, the UE may utilize one or more components (a receive processor (e.g., receive processor 258), a transmit processor (e.g., transmit processor 264), a controller/processor (e.g., controller/processor 280), a memory (e.g., memory 282), a modem (e.g., implemented by one or more of the receive processor, the transmit processor, the controller/processor, the memory, and/or antenna(s)), and/or the like) to perform aspects of the SPS scheduling process 1000. In this regard, while a certain component or group of components of the UE may be described as performing aspects of the SPS scheduling process 1000, it is understood that in some instances alternative components and/or groups of components may be used to perform the same or similar aspects of the SPS scheduling process 1000.

At block 1002, the processor of the UE determines a periodicity for transmitting safety messages. The periodicity can be a supported semi-persistent scheduling (SPS) periodicity of a plurality of supported SPS periodicities (e.g., 20, 50, 100, 200, 300, 400, 500, 600, 700, 800, 900, 1000 ms or other suitable value). In this regard, the plurality of supported SPS periodicities may be defined by a specification (3gpp, SAE, etc.), the UE, or otherwise. For example, in some instances the plurality of supported SPS periodicities include SPS periodicities associated with Sidelink PC5 or LTE-V2X. In some instances, the processor, modem and/or other components of the UE may be programmed to facilitate the UE generating and/or transmitting safety messages using the plurality of supported SPS periodicities (or a subset thereof).

In some instances, the processor determines the periodicity, at block 1002, by rounding a calculated periodicity to a supported SPS periodicity of a specification and/or a multiple of a 100-millisecond periodicity. In some instances, at block 1002, the processor rounds a safety message generation periodicity determined by a congestion control algorithm to a supported SPS periodicity of the plurality of supported SPS periodicities. In this regard, the congestion control algorithm can be an SAE distributed congestion control (DCC) algorithm and the safety message generation periodicity can be a maximum inter-transmission time (MAX_ITT). In some instances, MAX_ITT is calculated as MAX_ITT=min (600 ms, max (100 ms, N/B*100 ms)), where 600 ms is the maximum allowed MAX_ITT, 100 ms is the minimum allowed MAX_ITT, N is the number of devices within a 100 m radius and B is a density factor with a default value of 25. In other instances, different values for the maximum, minimum, and density may be utilized. In other regards, the congestion control algorithm can be a distributed congestion control (DCC) algorithm that generates a generation periodicity based on measured load, device speed, and/or other parameters.

At block 1004, the processor of the UE sends an SPS reservation request to the modem based on the periodicity determined at block 1002.

At block 1006, the modem obtains the SPS reservation based on the request received from the processor.

At block 1008, the processor of the UE generates data (e.g., a safety message) at the periodicity determined at block 1002.

At block 1010, the processor of the UE communicates the data/safety message to the modem.

At block 1012, the modem selects resources (e.g., time and/or frequency resources) for transmitting the data/safety message at the SPS periodicity obtained at block 1006.

At block 1014, the modem transmits the data/safety message using the resources selected at 1012 and based on the obtained SPS periodicity.

At block 1016, the processor of the UE determines whether the periodicity of the data/safety messages should remain the same or be updated. If the processor determines that the periodicity should remain the same, then the UE will continue a loop of blocks 1008-1016 at the current periodicity until the processor determines at block 1016 that the periodicity should be updated.

The processor can determine, at block 1016, that the periodicity should be updated when the processor determines a periodicity different than the current periodicity should be used. In some instances, the updated periodicity is also a supported SPS periodicity of the plurality of supported SPS periodicities (e.g., 20, 50, 100, 200, 300, 400, 500, 600, 700, 800, 900, 1000 ms or other suitable value). In some instances, the processor determines the updated periodicity by rounding a calculated periodicity to a supported SPS periodicity of a specification and/or a multiple of a 100-millisecond periodicity. In some instances, the processor rounds a safety message generation periodicity determined by a congestion control algorithm to a supported SPS periodicity of the plurality of supported SPS periodicities. In this regard, the congestion control algorithm can be an SAE distributed congestion control (DCC) algorithm and the safety message generation periodicity can be a maximum inter-transmission time (MAX_ITT). In some instances, MAX_ITT is calculated as MAX_ITT=min (600 ms, max (100 ms, N/B*100 ms)), where 600 ms is the maximum allowed MAX_ITT, 100 ms is the minimum allowed MAX_ITT, N is the number of devices within a 100 m radius and B is a density factor with a default value of 25. In other instances, different values for the maximum, minimum, and density may be utilized.

In some instances, the processor determines the updated periodicity by rounding a calculated periodicity to the second periodicity based on a hysteresis parameter (e.g., a hysteresis parameter as described with reference to FIGS. 12A and 12B). In this regard, the hysteresis parameter may increase the range of calculated periodicities that will result in the processor rounding to the current periodicity (e.g., the first periodicity) and, therefore, maintaining the current periodicity. This can prevent a UE from attempting to repeatedly switch back and forth between two adjacent periodicities when the calculated periodicity value is near a rounding boundary of the adjacent periodicities and small changes in the environment and/or communications can potentially result in a different periodicity determination.

In some instances, the hysteresis parameter is a percentage of a gap between the current periodicity and an adjacent supported periodicity. For example, if the current periodicity is 300 ms and an adjacent supported periodicity is 400 ms (or 200 ms), then the gap is 100 ms. In some instances, the percentage is between 0% and 50%, including between 5% and 15%. In some instances, the processor randomly selects a value for the hysteresis parameter from a set of available values for the hysteresis parameter. In this regard, by having each UE randomly select a hysteresis parameter, the likelihood of a large number of UEs changing periodicities at the same time is reduced because the UEs will have different rounding ranges as a result of the different values of the hysteresis parameter from the random selections.

In some instances, at block 1016, the processor rounds the calculated periodicity to a supported periodicity based on determining whether the calculated periodicity is less than $(T_n+T_{n-1})/2-(T_n-T_{n-1})*H$ or greater than $(T_n+T_{n+1})/2+(T_{n+1}-T_n)*H$, where $T_n$ is the current periodicity, $T_{n-1}$ is a supported periodicity less than the current periodicity, $T_{n+1}$ is a supported periodicity greater than the current periodicity, and H is the hysteresis parameter.

If the calculated periodicity at block 1016 is less than $(T_n+T_{n-1})/2-(T_n-T_{n-1})*H$, then the processor rounds the calculated periodicity to a lower periodicity value (e.g., $T_{n-1}$) than the current periodicity. If the calculated periodicity at block 1016 is greater than $(T_n+T_{n+1})/2+(T_{n+1}-T_n)*H$, then the processor rounds the calculated periodicity to a higher periodicity value (e.g., $T_{n+1}$) than the current periodicity. If the calculated periodicity at block 1016 is between $(T_n+T_{n-1})/2-(T_n-T_{n-1})*H$ and $(T_n+T_{n+1})/2+(T_{n+1}-T_n)*H$, then the processor rounds the calculated periodicity to the current periodicity and, therefore, the periodicity is not changed.

In some instances, at block 1016 the processor determines whether to continue with the first periodicity or switch to the second periodicity based on a probabilistic determination process. That is, even where the processor determines a change in periodicity may be warranted (e.g., based on a MAX_ITT calculation), the processor can utilize a probabilistic determination process to determine whether to actually change the periodicity or continue with the current periodicity. The probabilistic determination process can include a weighted coin flip, probabilistic Boolean operation, or other suitable technique. In some instances, the probabilistic determination process is weighted towards the current periodicity. That is, the probabilistic determination process is biased towards maintaining the current periodicity instead of switching to a different periodicity. In this regard, in some instances the probabilistic determination process is weighted towards the first periodicity between 2:1 and 100:1, such as 5:1, 6:1, 7:1, 8:1, 9:1, 10:1, 15:1, 20:1, 25:1, 50:1, or other suitable value. In some instances, the processor executes block 1016 and determines whether to continue with the current periodicity or switch to the updated periodicity at a scheduled packet generation time period associated with the current periodicity and prior to transmission of a packet generated at the scheduled packet generation time period.

At block 1018, the processor of the UE sends an updated SPS reservation request to the modem based on the updated periodicity determined at block 1016.

At block 1020, the modem obtains the updated SPS reservation based on the request received from the processor at block 1018. In some instances, the modem requests and/or obtains the updated SPS reservation upon receipt of the SPS reservation request from the processor (see, e.g., FIG. 14). In some instances, the modem delays requesting and/or obtaining the updated SPS reservation after receipt of the SPS reservation request from the processor (see, e.g., FIGS. 15 and 16).

At block 1022, the processor of the UE generates data (e.g., a safety message) at the periodicity determined at block 1016.

At block 1024, the processor of the UE communicates the data/safety message, generated at block 1022, to the modem.

At block 1026, the modem selects resources (e.g., time and/or frequency resources) for transmitting the data/safety message received at block 1024 at the SPS periodicity obtained at block 1020.

At block 1028, the modem transmits the data/safety message using the resources selected at block 1026 and based on the SPS periodicity obtained at 1020.

At block 1030, the processor of the UE determines whether the periodicity of the data/safety messages should remain the same or be updated (in the same or similar manner as block 1016) and the process continues in an iterative loop through blocks similar to or the same as blocks 1016-1028.

Figure 11:
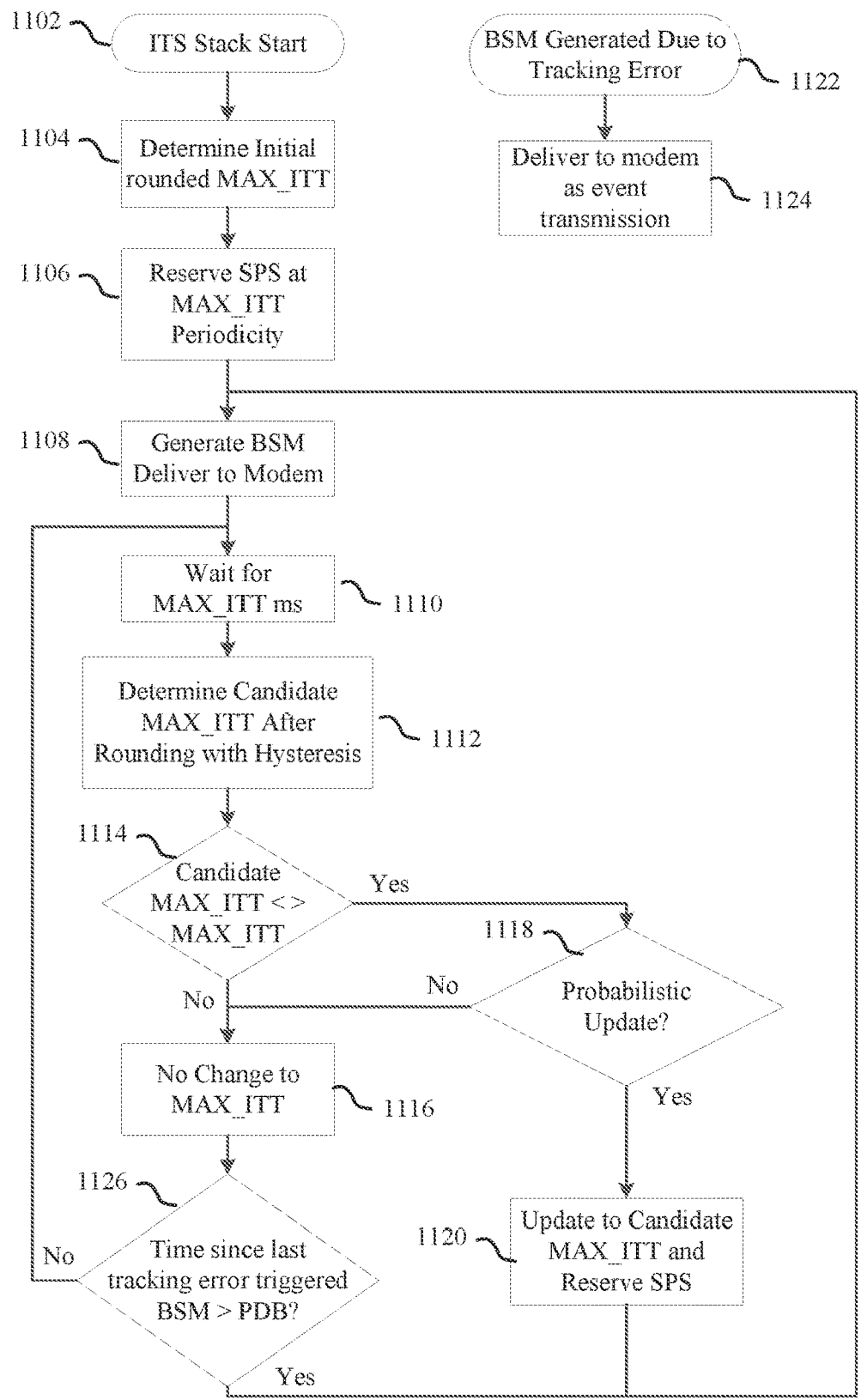
FIG. 11 is a flow diagram of a safety message generation and scheduling process according to some aspects of the present disclosure.

FIG. 11 is a flow diagram of a safety message generation and scheduling process 1100 in accordance with various aspects of the present disclosure. As shown, aspects of the safety message generation and scheduling process 1100 may be performed by a UE (e.g., UE 120 illustrated and described in connection with FIGS. 1 and 2, the UEs illustrated and described in connection with FIGS. 3, 4, 5, 6A-6C, 7, 9, and 10). In this regard, the UE may utilize one or more components (a receive processor (e.g., receive processor 258), a transmit processor (e.g., transmit processor 264), a controller/processor (e.g., controller/processor 280), a memory (e.g., memory 282), a modem (e.g., implemented by one or more of the receive processor, the transmit processor, the controller/processor, the memory, and/or antenna(s)), and/or the like) to perform aspects of the safety message generation and scheduling process 1100. In this regard, while a certain component or group of components of the UE may be described as performing aspects of the safety message generation and scheduling process 1100, it is understood that in some instances alternative components and/or groups of components may be used to perform the same or similar aspects of the safety message generation and scheduling process 1100.

At block 1102, an intelligent transport system (ITS) stack process starts. The ITS stack can be a safety program (e.g., SAE ITS stack) or another program executed by a processor of the UE.

At block 1104, the UE determines a maximum inter-transmission time (MAX_ITT) and rounds the MAX_ITT to a supported SPS periodicity. In some instances, the UE rounds the calculated MAX_ITT to a supported SPS periodicity of a specification and/or a multiple of a 100-millisecond periodicity. In some instances, MAX_ITT is calculated as MAX_ITT=min (600 ms, max (100 ms, N/B*100 ms)), where 600 ms is the maximum allowed MAX_ITT, 100 ms is the minimum allowed MAX_ITT, N is the number of devices within a 100 m radius and B is a density factor with a default value of 25. In other instances, different values for the maximum, minimum, and density may be utilized.

At block 1106, the UE makes an SPS reservation based on the periodicity determined at block 1104.

At block 1108, the processor of the UE generates a basic safety message and delivers the generated basic safety message to a modem of the UE at the periodicity determined at block 1104.

At block 1110, the processor of the UE waits for the periodicity determined at block 1104.

At block 1112, the processor of the UE determines a candidate MAX_ITT after rounding with hysteresis. In some instances, the processor determines the candidate MAX_ITT by rounding a calculated MAX_ITT to a supported SPS periodicity based on a hysteresis parameter (see, e.g., FIGS. 12A and 12B). In this regard, the hysteresis parameter may increase the range of calculated MAX_ITT values that will result in the processor rounding to the current periodicity and, therefore, maintaining the current periodicity. This can prevent a UE from attempting to repeatedly switch back and forth between two adjacent periodicities when the calculated MAX_ITT value is near a rounding boundary of the adjacent periodicities and small changes in the environment and/or communications can potentially result in a different periodicity determination.

In some instances, the hysteresis parameter is a percentage of a gap between the current periodicity and an adjacent supported periodicity. For example, if the current periodicity is 300 ms and an adjacent supported periodicity is 400 ms (or 200 ms), then the gap is 100 ms. In some instances, the percentage is between 0% and 50%, including between 5% and 15%. In some instances, the processor randomly selects a value for the hysteresis parameter from a set of available values for the hysteresis parameter. In this regard, by having each UE randomly select a hysteresis parameter, the likelihood of a large number of UEs changing periodicities at the same time is reduced because the UEs will have different rounding ranges as a result of the different values of the hysteresis parameter from the random selections.

In some instances, at block 1112, the processor rounds the calculated candidate MAX_ITT to a supported periodicity based on determining whether the calculated MAX_ITT is less than (Tn+Tn−1)/2−(Tn−Tn−1)*H or greater than (Tn+Tn+1)/2+(Tn+1−Tn)*H, where Tn is the current periodicity, Tn−1 is a supported periodicity less than the current periodicity, Tn+1 is a supported periodicity greater than the current periodicity, and H is the hysteresis parameter. In this regard, if the calculated candidate MAX_ITT at block 1112 is less than (Tn+Tn−1)/2−(Tn−Tn−1)*H, then the processor rounds the calculated candidate MAX_ITT at block 1112 to a lower periodicity value (e.g., Tn−1) than the current periodicity. Similarly, if the calculated candidate MAX_ITT at block 1112 is greater than (Tn+Tn+1)/2+(Tn+1−Tn)*H, then the processor rounds the calculated candidate MAX_ITT at block 1112 to a higher periodicity (e.g., Tn+1) than the current periodicity. If the calculated periodicity at block 1112 is between (Tn+Tn−1)/2−(Tn−Tn−1)*H and (Tn+Tn+1)/2+(Tn+1−Tn)*H, then the processor rounds the calculated candidate MAX_ITT at block 1112 to the current periodicity and, therefore, the periodicity is not changed.

At block 1114, the processor determines whether the periodicity/MAX_ITT determined at block 1112 is different than the current periodicity/MAX_ITT. For example, the processor can determine if the periodicity/MAX_ITT (from block 1114) is greater than or less than the current periodicity/MAX_ITT (from block 1104). If not, then the safety message generation and scheduling process 1100 continues to block 1116 and no change is made to the periodicity/MAX_ITT.

If the processor determines, at block 1114, that the periodicity/MAX_ITT determined at block 1112 is different than the current periodicity/MAX_ITT, then the safety message generation and scheduling process 1100 continues to block 1118 where the processor of the UE determines whether the periodicity should remain the same or be updated to the periodicity/MAX_ITT determined at block 1112 based on a probabilistic determination process. The probabilistic determination process can include a weighted coin flip, probabilistic Boolean operation, or other suitable technique. In some instances, the probabilistic determination process is weighted towards the current periodicity. That is, the probabilistic determination process is biased towards maintaining the current periodicity instead of switching to the periodicity/MAX_ITT determined at block 1112. In this regard, in some instances the probabilistic determination process is weighted towards the first periodicity between 2:1 and 100:1, such as 5:1, 6:1, 7:1, 8:1, 9:1, 10:1, 15:1, 20:1, 25:1, 50:1, or other suitable value. In some instances, the processor executes block 1118 and determines whether to continue with the current periodicity or switch to the periodicity/MAX_ITT determined at block 1112 at a scheduled packet generation time period associated with the current periodicity (e.g., as a result of the delay at block 1110) and prior to transmission of a packet generated at the scheduled packet generation time period.

If the processor determines, at block 1118, that the current periodicity/MAX_ITT should not be updated, then the safety message generation and scheduling process 1100 continues to block 1116 and no change is made to the periodicity/MAX_ITT. If the processor determines, at block 1118, that the current periodicity/MAX_ITT should be updated and changed to the periodicity/MAX_ITT determined at block 1112, then the safety message generation and scheduling process 1100 continues to block 1120. At block 1120, the periodicity is updated to the periodicity/MAX_ITT determined at block 1112 and the UE makes an SPS reservation based on the updated periodicity. The safety message generation and scheduling process 1100 then continues to block 1108 as shown.

In some instances, the UE generates safety messages at the calculated periodicity independent from tracking error at potential devices receiving the transmissions.

In some instances, the UE detects a tracking error and generates, in response to the detected tracking error, a tracking error-based safety message at block 1122. At block 1124, the UE can deliver the tracking error-based safety message to a modem of the UE as an event transmission separate from the SPS-scheduled safety messages generation and transmission. Accordingly, the tracking error-based safety message generated may be generated and/or transmitted separate from the plurality of supported SPS periodicities (see, e.g., FIGS. 13B and 13C).

Figure 13A:
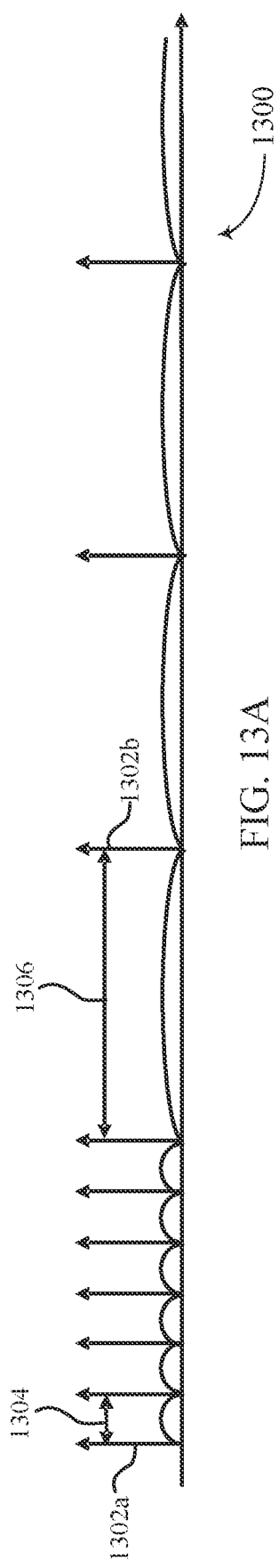
FIGS. 13A, 13B, and 13C are diagrams of safety message generation according to some aspects of the present disclosure.
Figure 13B:
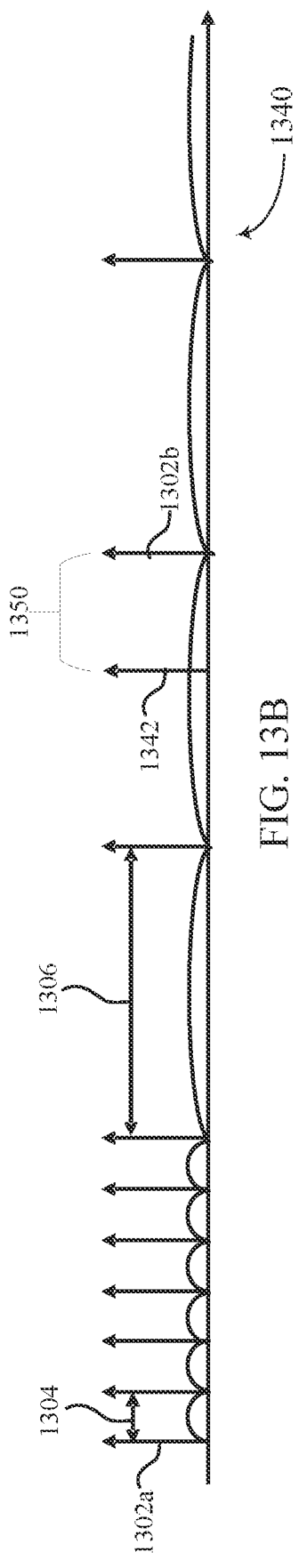
Figure 13C:
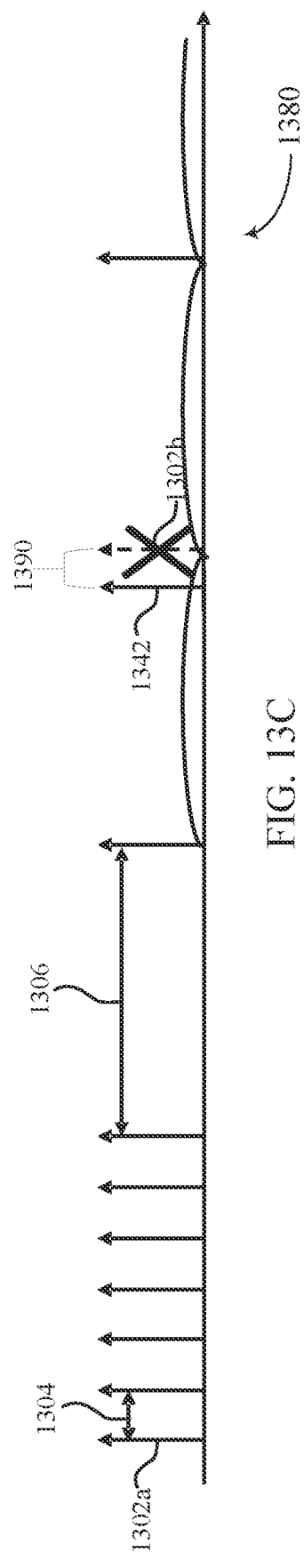

In some instances, the UE refrains from generating a safety message during a scheduled generation time period associated with an SPS periodicity when the tracking error-based safety message is generated within a threshold amount of time of the scheduled generation time period (see, e.g., FIG. 13C). In some instances, the threshold amount of time is based on a packet delay budget (e.g., 50, 100, 200 ms or other suitable value) or other parameter. For example, at block 1126, the processor of the UE can determine whether the time elapsed since a last tracking error-based safety message is greater than a packet delay budget. If so, then the safety message generation and scheduling process 1100 continues to block 1108 and the next scheduled safety message is generated and delivered to the modem. However, if the time elapsed since a last tracking error-based safety message is less than a packet delay budget, then the next scheduled safety message is skipped and the safety message generation and scheduling process 1100 can continues to block 1110. However, in some instances, the UE proceeds with generating a safety message during the scheduled generation time period even when the tracking error-based safety message was generated less than the threshold amount of time prior to the scheduled generation time period. For example, if the scheduled generation time period is associated with a change in periodicity (e.g., from the first periodicity to the second periodicity), then the UE may continue to block 1108 and generate and deliver the next scheduled safety message to the modem.

Figure 12A:
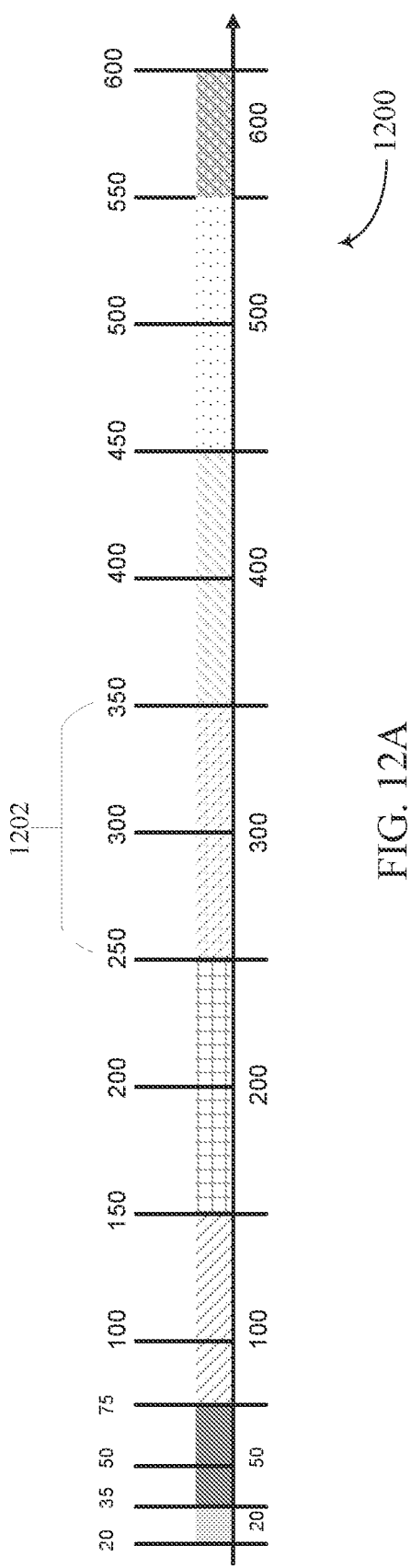
FIGS. 12A and 12B are diagrams of SPS periodicity rounding ranges with a hysteresis parameter according to some aspects of the present disclosure
Figure 12B:
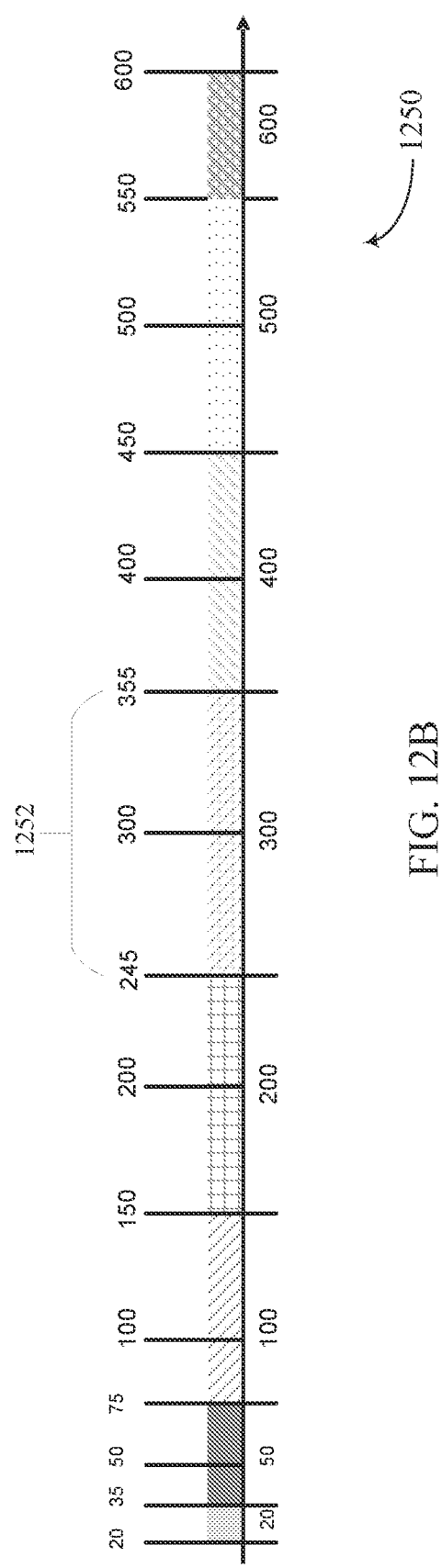

FIGS. 12A and 12B are diagrams of SPS periodicity rounding ranges with a hysteresis parameter in accordance with various aspects of the present disclosure. In this regard, FIG. 12A illustrates a diagram 1200 where the hysteresis parameter is set to zero such that the rounding ranges are equal between adjacent support SPS periodicities. That is, in diagram 1200 the rounding ranges have an even distribution between adjacent periodicities (e.g., like having no hysteresis parameter). For example, a range 1202 extending from 250 to 350 defines the values that a UE will round to a periodicity of 300 ms. That is, for calculated periodicity values (e.g., MAX_ITT) between 250 and 350, the UE can round the calculated periodicity to 300 ms, which is one of the supported SPS periodicities of FIG. 12A, along with 20, 50, 100, 200, 300, 400, 500, and 600 ms.

FIG. 12B illustrates a diagram 1250 where the hysteresis parameter increases the rounding range of a current periodicity. In this manner, the hysteresis parameter can increase the range of calculated periodicities that will result in the UE rounding to the current periodicity and, therefore, maintaining the current periodicity. Use of a hysteresis parameter in this manner can prevent a UE from attempting to repeatedly switch back and forth between two adjacent periodicities when the calculated periodicity value is near a rounding boundary of the adjacent periodicities and small changes in the environment and/or communications can potentially result in a different periodicity determination.

In some instances, the hysteresis parameter is a percentage of a gap between the first periodicity and an adjacent supported periodicity. For example, as shown in FIG. 12B, if the current periodicity is 300 ms and the adjacent supported periodicities are 200 ms and 400 ms, then the gap is 100 ms for both adjacent periodicities. However, if the adjacent supported periodicities are 200 ms and 350 ms, then the gap would be 100 ms relative to the 200 ms periodicity and the gap would be 50 ms relative to the 350 ms periodicity. In some instances, the percentage is between 0% and 50%, including between 5% and 15%. FIG. 12B shows an example of a hysteresis percentage of 5% for a current periodicity of 300 ms. As shown, a range 1502 extending from 245 to 355 defines the values that a UE will round to the periodicity of 300 ms as a result of the 5% hysteresis parameter and the 100 ms gap between the adjacent supported periodicities.

In some instances, the UE randomly selects a value for the hysteresis parameter from a set of available values for the hysteresis parameter. In this regard, by having each UE randomly select a hysteresis parameter, the likelihood of a large number of UEs changing periodicities at the same time is reduced because the UEs will have different rounding ranges as a result of the different values of the hysteresis parameter from the random selections.

In some instances, the UE rounds a calculated periodicity or MAX_ITT to a supported periodicity based on determining whether the calculated periodicity is less than $(Tn+Tn-1)/2-(Tn-Tn-1)*H$ or greater than $(Tn+Tn+1)/2+(Tn+1-Tn)*H$, where $Tn$ is the current periodicity, $Tn-1$ is a supported periodicity less than the current periodicity, $Tn+1$ is a supported periodicity greater than the current periodicity, and $H$ is the hysteresis parameter. In this regard, if the calculated periodicity is less than $(Tn+Tn-1)/2-(Tn-Tn-1)*H$, then the UE rounds the calculated periodicity to a lower periodicity value (e.g., $Tn-1$) than the current periodicity. Similarly, if the calculated periodicity is greater than $(Tn+Tn+1)/2+(Tn+1-Tn)*H$, then the UE rounds the calculated periodicity to a higher periodicity (e.g., $Tn+1$) than the current periodicity. If the calculated periodicity is between (Tn+Tn−1)/2−(Tn−Tn−1)*H and (Tn+Tn+1)/2+(Tn+1−Tn)*H, then the UE rounds the calculated periodicity to the current periodicity and, therefore, the periodicity is not changed.

FIGS. 13A, 13B, and 13C are diagrams of safety message generation in accordance with various aspects of the present disclosure.

FIG. 13A illustrates a safety message generation 1300 showing a plurality of safety messages 1302a generated at a periodicity 1304 and a plurality of safety messages 1302b generated at a periodicity 1306 that is different from periodicity 1304. In the illustrated example, the periodicity 1306 is greater than the periodicity 1304, but in other instances the periodicity 1306 is less than the periodicity 1304. The periodicities 1304 and 1306 can be a supported SPS periodicity (e.g., 20, 50, 100, 200, 300, 400, 500, 600, 700, 800, 900, 1000 ms or other suitable value). In this regard, the SPS periodicities that are supported may be defined by a specification (3gpp, SAE, etc.), the UE, or otherwise. For example, in some instances the supported SPS periodicities include SPS periodicities associated with Sidelink PC5 or LTE-V2X. In some instances, the processor, modem and/or other components of the UE may be programmed to facilitate the UE generating and/or transmitting safety messages using the plurality of supported SPS periodicities (or a subset thereof).

FIG. 13B illustrates a safety message generation 1340. The safety message generation 1340 is similar in many respects to safety message generation 1300 of FIG. 13A, including showing a plurality of safety messages 1302a generated at a periodicity 1304 and a plurality of safety messages 1302b generated at a periodicity 1306 that is different from periodicity 1304. Safety message generation 1340 also includes a tracking error-based safety message that can be generated (and transmitted) as an event transmission separate from the SPS-scheduled safety messages 1302a and 1302b. In some instances, the UE refrains from generating a safety message during a scheduled generation time period associated with an SPS periodicity when the tracking error-based safety message 1342 is generated within a threshold amount of time of the scheduled generation time period associated with the SPS periodicity. In FIG. 13B, the time period 1350 is larger than the threshold (e.g., packet delay budget) and, therefore, the UE proceeds with generating the next scheduled packet associated with the SPS periodicity as shown.

However, FIG. 13C illustrates a safety message generation 1380 where the tracking error-based safety message 1342 is generated within the threshold amount of time of the scheduled generation time period associated with the SPS periodicity. As shown in FIG. 13C, the time period 1390 is less than the threshold (e.g., packet delay budget) and, therefore, the UE skips the next scheduled packet generation associated with the SPS periodicity (as indicated by the "X"). In some instances, the UE proceeds with generating the safety message 1302b at the scheduled generation time period if the scheduled generation time period is associated with a change in periodicity, even if the time period 1390 is less than the threshold amount of time prior to the scheduled generation time period.

Figure 14:
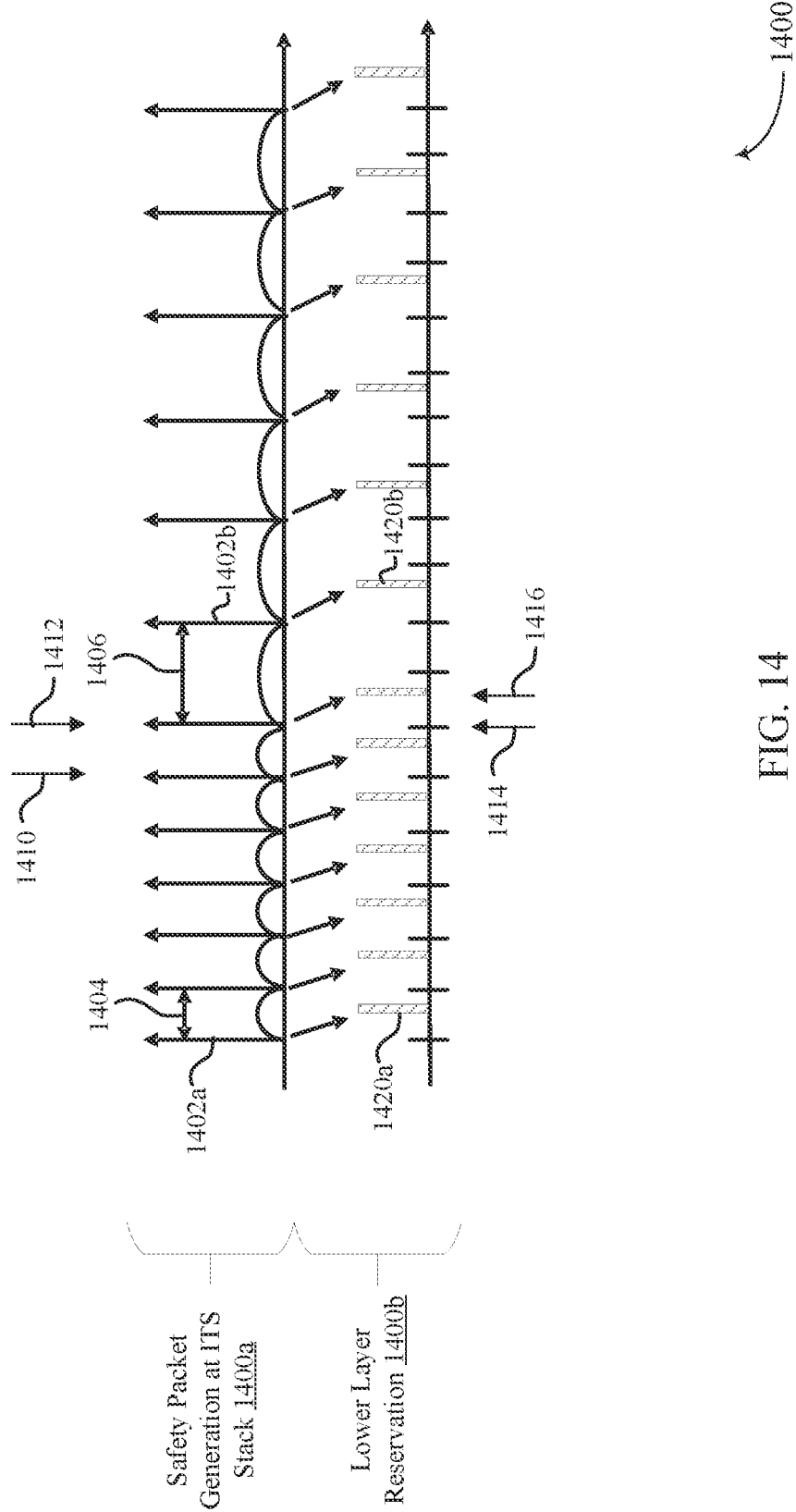
FIGS. 14-16 are diagrams of safety message generation and scheduling according to some aspects of the present disclosure.
Figure 15:
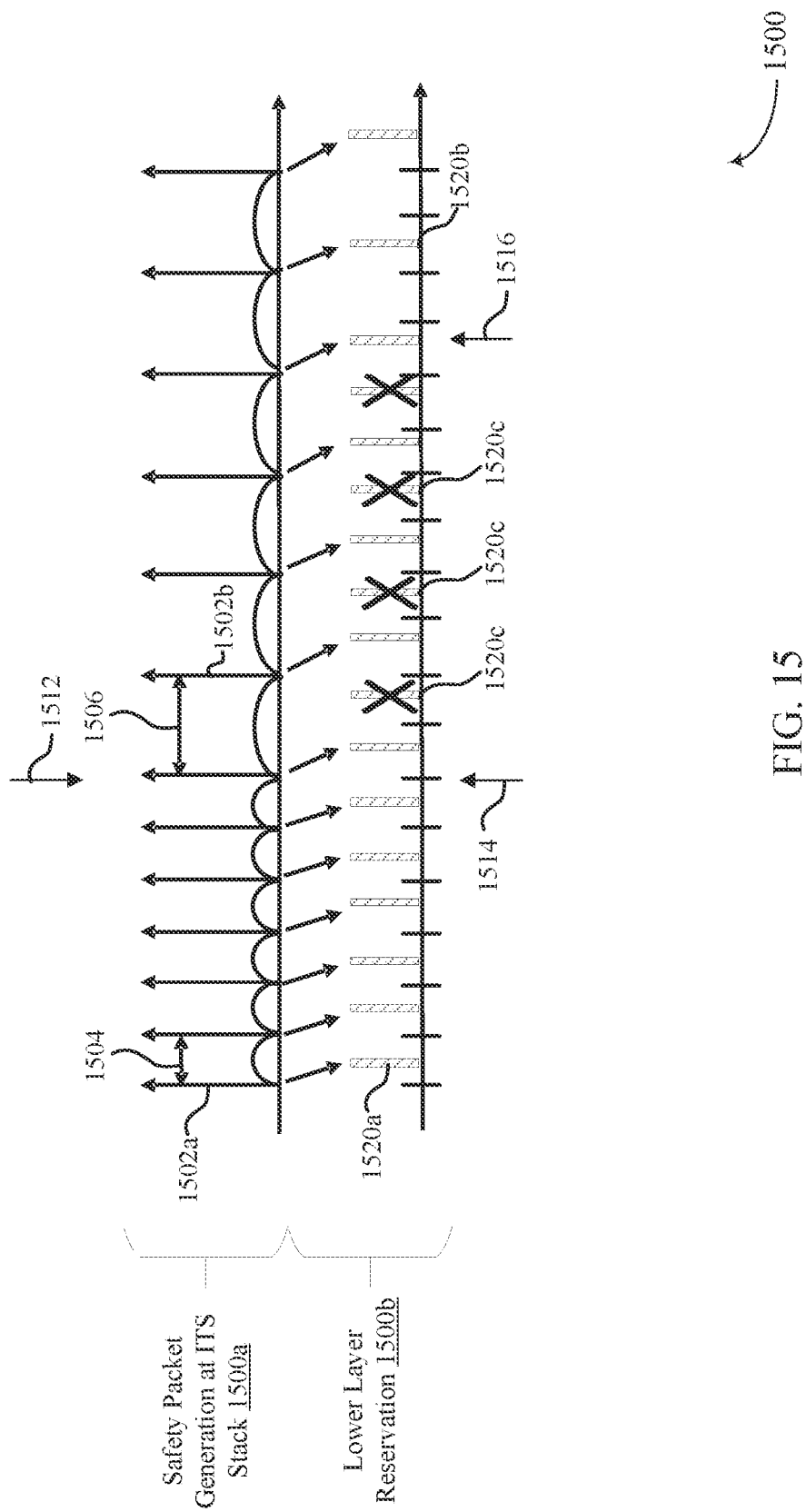
Figure 16:
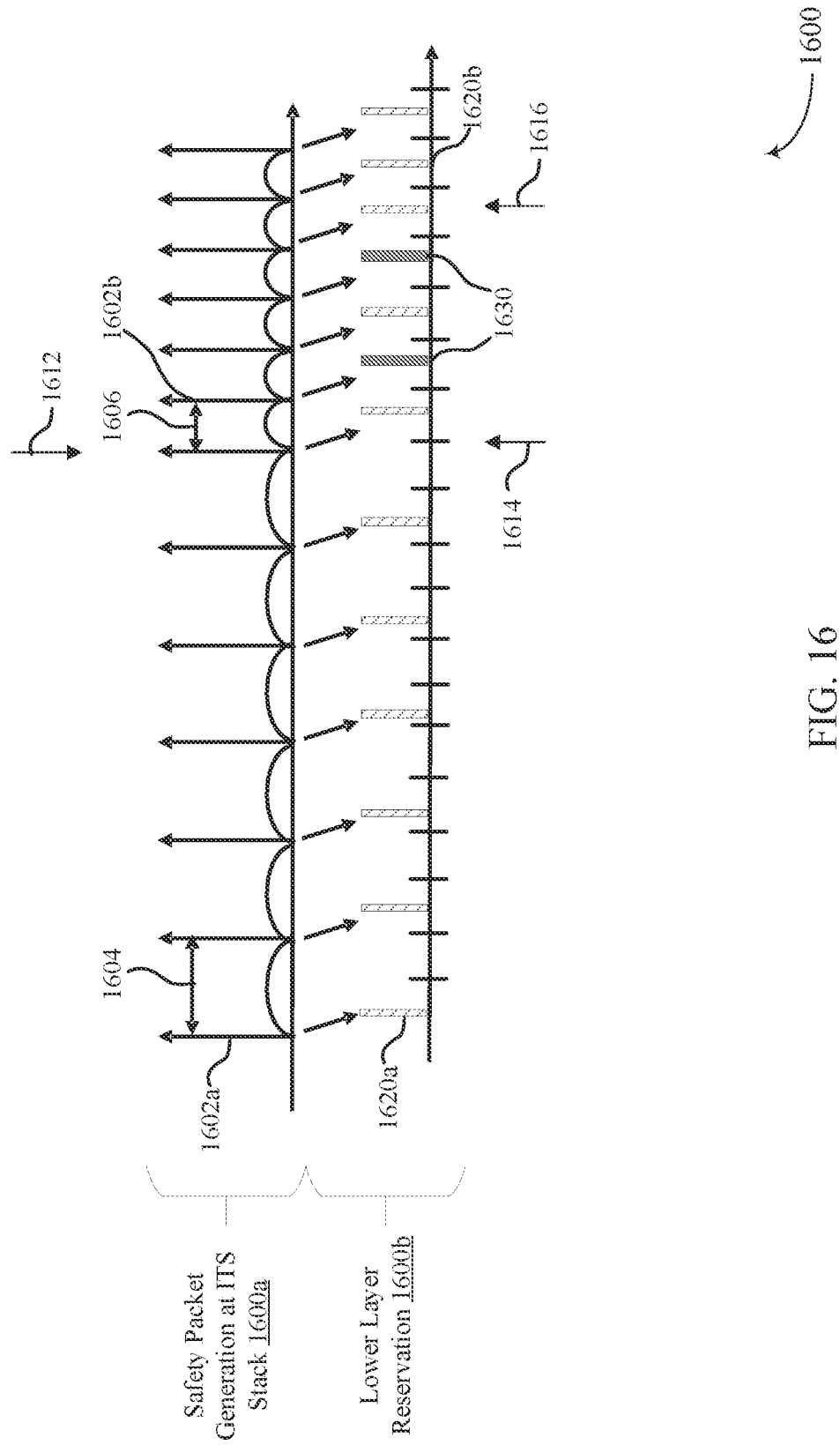

FIGS. 14-16 are diagrams of safety message generation and scheduling in accordance with various aspects of the present disclosure.

FIG. 14 illustrates a diagram of safety message generation and scheduling 1400 in accordance with various aspects of the present disclosure. The diagram illustrates safety packet generation at an ITS stack 1400a (e.g., at a processor of a UE) and lower layer reservations 1400b (e.g., at a modem of a UE) in accordance with aspects of the present disclosure.

The safety packet generation ITS stack 1400a shows a plurality of safety message packet generation time periods 1402a at a periodicity 1404 and a plurality of safety message packet generation time periods 1402b at a periodicity 1406 that is different from periodicity 1404. In the illustrated example, the periodicity 1406 is greater than the periodicity 1404, but in other instances the periodicity 1406 is less than the periodicity 1404. The periodicities 1404 and 1406 can be a supported SPS periodicity (e.g., 20, 50, 100, 200, 300, 400, 500, 600, 700, 800, 900, 1000 ms or other suitable value). In this regard, the SPS periodicities that are supported may be defined by a specification (3gpp, SAE, etc.), the UE, or otherwise. For example, in some instances the supported SPS periodicities include SPS periodicities associated with Sidelink PC5 or LTE-V2X. In some instances, the processor, modem and/or other components of the UE may be programmed to facilitate the UE generating and/or transmitting safety messages using the plurality of supported SPS periodicities (or a subset thereof).

At each safety message packet generation time period 1402a, the ITS stack/processor can generate a safety message packet 1420a that is communicated to the lower layer/modem of the UE. Similarly, at each safety message packet generation time period 1402b, the ITS stack/processor can generate a safety message packet 1420b that is communicated to the lower layer/modem of the UE. The lower layer/modem of the UE can then transmit the safety message packets 1420a, 1420b.

FIG. 14 illustrates an example where at time period 1410 the UE determines an updated periodicity has been calculated or determined (see, e.g., FIG. 11, block 1114 ("yes")), but a probabilistic determination indicates to keep the current periodicity (see, e.g., FIG. 11, block 1118 ("no")). However, at time period 1412, the UE again determines an updated periodicity has been calculated or determined (see, e.g., FIG. 11, block 1114 ("yes")) and the probabilistic determination indicates to update the current periodicity to the new periodicity (see, e.g., FIG. 11, block 1118 ("yes")). Accordingly, the ITS stack/processor of the UE communicates to the lower layer/modem of the UE an updated SPS reservation request (see, e.g., FIG. 10, block 1018), which is received by the lower layer/modem of the UE at time period 1414. As shown, the lower layer/modem of the UE can receive the updated SPS reservation request prior to receiving the last safety message packet 1420a generated at the current SPS periodicity 1404. Accordingly, in some instances the ITS stack/processor of the UE communicates the updated SPS reservation request to the modem prior to generating the first data packet 1402b at the updated SPS periodicity 1406. Upon receiving the updated SPS reservation request at time period 1414, the lower layer/modem of the UE can obtain the updated SPS (see, e.g., FIG. 10, block 1020). In FIG. 14, the lower layer/modem of the UE requests and/or obtains the updated SPS reservation upon receipt of the SPS reservation request from the processor, as indicated by time period 1416. In some instances, the modem delays requesting and/or obtaining the updated SPS reservation after receipt of the SPS reservation request from the processor (see, e.g., FIGS. 15 and 16).

FIG. 15 illustrates a diagram of safety message generation and scheduling 1500 in accordance with various aspects of the present disclosure. The diagram illustrates safety packet generation at an ITS stack 1500a (e.g., at a processor of a UE) and lower layer reservations 1500b (e.g., at a modem of a UE) in accordance with aspects of the present disclosure.

The safety packet generation ITS stack 1500a shows a plurality of safety message packet generation time periods 1502a at a periodicity 1504 and a plurality of safety message packet generation time periods 1502b at a periodicity 1506 that is different from periodicity 1504. At each safety message packet generation time period 1502a, the ITS stack/processor can generate a safety message packet 1520a that is communicated to the lower layer/modem of the UE. Similarly, at each safety message packet generation time period 1502b, the ITS stack/processor can generate a safety message packet 1520b that is communicated to the lower layer/modem of the UE. The lower layer/modem of the UE can then transmit the safety message packets 1520a, 1520b.

FIG. 15 illustrates an example where, at time period 1512, the UE determines an updated periodicity has been calculated or determined (see, e.g., FIG. 11, block 1114 ("yes")) and the probabilistic determination indicates to update the current periodicity to the new periodicity (see, e.g., FIG. 11, block 1118 ("yes")). Accordingly, the ITS stack/processor of the UE communicates to the lower layer/modem of the UE an updated SPS reservation request (see, e.g., FIG. 10, block 1018), which is received by the lower layer/modem of the UE at time period 1514. As shown, the lower layer/modem of the UE can receive the updated SPS reservation request prior to receiving the last safety message packet 1520a generated at the current SPS periodicity 1504. Accordingly, in some instances the ITS stack/processor of the UE communicates the updated SPS reservation request to the modem prior to generating the first data packet 1502b at the updated SPS periodicity 1506.

Upon receiving the updated SPS reservation request at time period 1514, the lower layer/modem of the UE can obtain the updated SPS (see, e.g., FIG. 10, block 1020). In FIG. 15, the lower layer/modem of the UE delays requesting and/or obtaining the updated SPS reservation until time period 1516 after receipt of the updated SPS reservation request from the processor. However, the lower layer/modem of the UE can implement the updated SPS periodicity upon receipt of the updated SPS reservation request by omitting scheduled safety message packets under the current periodicity 1504, as indicated by the "X" through safety message packets 1520c. FIG. 15 illustrates an example where the lower layer/modem of the UE delays requesting and/or obtaining the updated SPS reservation with an increase in the periodicity. FIG. 16 illustrates another example where the lower layer/modem of the UE delays requesting and/or obtaining the updated SPS reservation with a decrease in the periodicity.

FIG. 16 illustrates a diagram of safety message generation and scheduling 1600 in accordance with various aspects of the present disclosure. The diagram illustrates safety packet generation at an ITS stack 1600a (e.g., at a processor of a UE) and lower layer reservations 1600b (e.g., at a modem of a UE) in accordance with aspects of the present disclosure.

The safety packet generation ITS stack 1600a shows a plurality of safety message packet generation time periods 1602a at a periodicity 1604 and a plurality of safety message packet generation time periods 1602b at a periodicity 1606 that is different from periodicity 1604. In the illustrated example, the periodicity 1606 is smaller than the periodicity 1604. At each safety message packet generation time period 1602a, the ITS stack/processor can generate a safety message packet 1620a that is communicated to the lower layer/modem of the UE. Similarly, at each safety message packet generation time period 1602b, the ITS stack/processor can generate a safety message packet 1620b that is communicated to the lower layer/modem of the UE. The lower layer/modem of the UE can then transmit the safety message packets 1620a, 1620b.

FIG. 16 illustrates an example where, at time period 1612, the UE determines an updated periodicity has been calculated or determined (see, e.g., FIG. 11, block 1114 ("yes")) and the probabilistic determination indicates to update the current periodicity to the new periodicity (see, e.g., FIG. 11, block 1118 ("yes")). Accordingly, the ITS stack/processor of the UE communicates to the lower layer/modem of the UE an updated SPS reservation request (see, e.g., FIG. 10, block 1018), which is received by the lower layer/modem of the UE at time period 1614. As shown, the lower layer/modem of the UE can receive the updated SPS reservation request prior to receiving the last safety message packet 1620a generated at the current SPS periodicity 1604. Accordingly, in some instances the ITS stack/processor of the UE communicates the updated SPS reservation request to the modem prior to generating the first data packet 1602b at the updated SPS periodicity 1606.

Upon receiving the updated SPS reservation request at time period 1614, the lower layer/modem of the UE can obtain the updated SPS (see, e.g., FIG. 10, block 1020). In FIG. 16, the lower layer/modem of the UE delays requesting and/or obtaining the updated SPS reservation until time period 1616 after receipt of the updated SPS reservation request from the processor. However, the lower layer/modem of the UE can implement the updated SPS periodicity upon receipt of the updated SPS reservation request by adding safety message packets 1630 (e.g., similar to a tracking error-based, one-shot, or event-based safety message packet) to the safety message packets 1620a scheduled under the current periodicity 1604. As shown, the safety message packets 1630 fill in the gaps between the current periodicity and the updated periodicity to provide transmissions of safety messages in accordance with the updated SPS periodicity prior to the modem reserving the updated SPS periodicity. Accordingly, while the illustrated example shows one additional safety message packet 1630 between each scheduled safety message packet 1620a, in other instances two, three, four, or more additional safety message packets 1630 may be used between each scheduled safety message packet 1620a.

Figure 17:
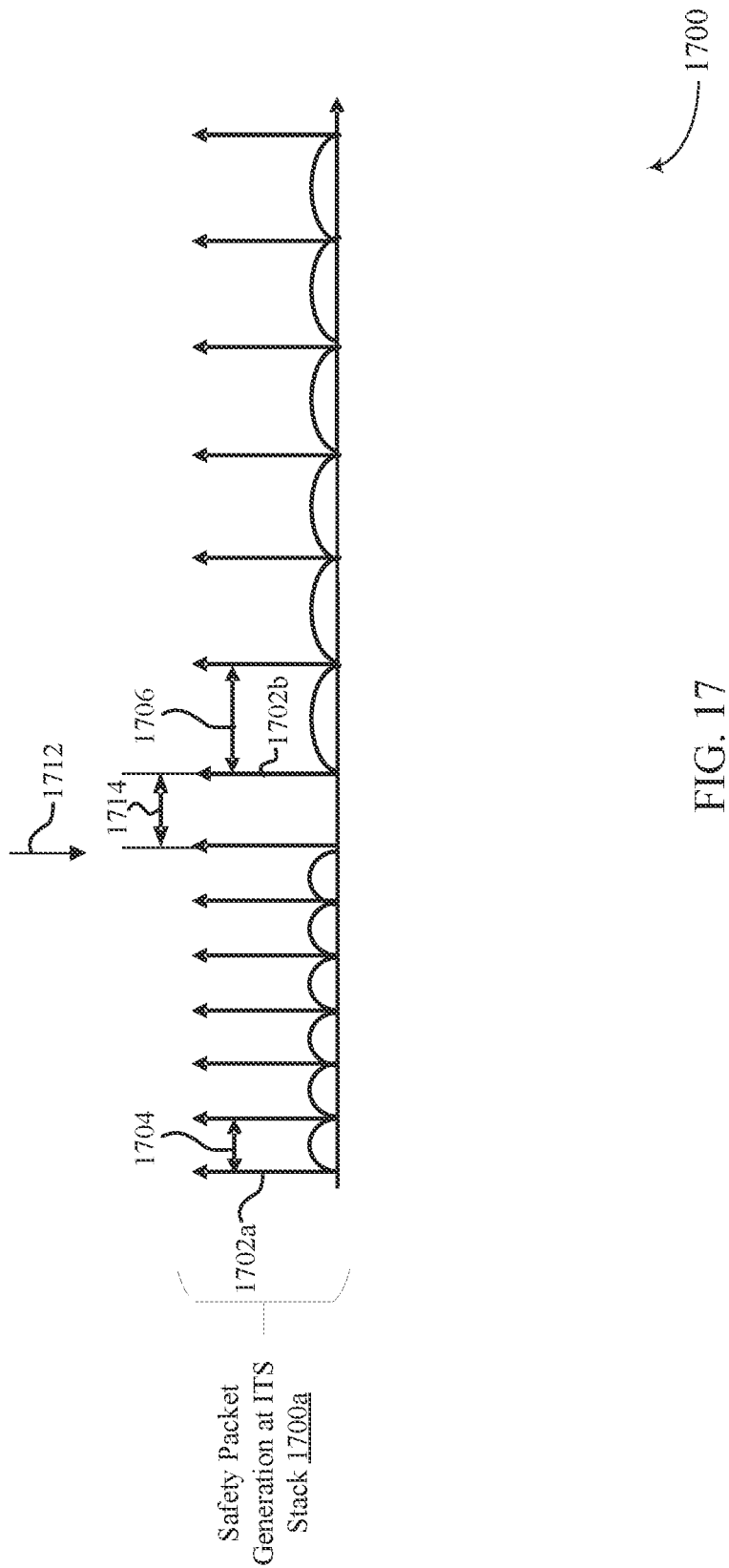
FIG. 17 is a diagram of safety message generation according to some aspects of the present disclosure.

FIG. 17 illustrates safety packet generation 1700 at an ITS stack 1700a (e.g., at a processor of a UE) in accordance with aspects of the present disclosure. The safety packet generation ITS stack 1700a shows a plurality of safety message packet generation time periods 1702a at a periodicity 1704 and a plurality of safety message packet generation time periods 1702b at a periodicity 1706 that is different from periodicity 1504. In the illustrated example, the periodicity 1706 is greater than the periodicity 1704. At each safety message packet generation time period 1702a, 1702b, the ITS stack/processor can generate a safety message packet that is communicated to the lower layer/modem of the UE. The lower layer/modem of the UE can then transmit the safety message packets in accordance with the associated SPS periodicity.

FIG. 17 illustrates an example where, at time period 1712, the UE determines an updated periodicity has been calculated or determined (see, e.g., FIG. 11, block 1114 ("yes")) and the probabilistic determination indicates to update the current periodicity to the new periodicity (see, e.g., FIG. 11, block 1118 ("yes")). In response to determining that the periodicity should be updated, the UE selects a random time offset 1714. In some instances, the UE selects the time offset 1714 from within a range or set of available time offsets. For example, in some instances the UE randomly selects the time offset 1714 from between 0 and the updated SPS periodicity 1706. The UE then generates an initial safety message 1702b associated with the updated SPS periodicity 1706 based on the selected time offset. In some instances, the UE generates the initial safety message 1702b associated with the updated SPS periodicity 1706 after the random time offset 1714 from a current time (e.g., time period 1712). For example, if the random time offset 1714 is greater than or equal to a threshold value, then the UE can generate the first safety message after the random time offset 1714 from the current time, as shown in FIG. 17.

In some instances, the UE generates the initial safety message 1702b associated with the updated SPS periodicity 1706 after the updated SPS periodicity from the current time. For example, if the random time offset 1714 is less than the threshold value, then the UE can generate the first safety message after the updated SPS periodicity 1706 from the current time. In some instances, the threshold value is between 50 ms and 200 ms, including 100 ms. In some instances, the threshold value is a minimum allowed SPS periodicity. The UE generates, following the initial safety message 1702b associated with the updated SPS periodicity 1706, subsequent safety messages 1702b associated with the second SPS periodicity using the updated SPS periodicity 1706, as shown.

By having the UE select the random time offset 1714 and generate its initial safety message 1702b of the updated periodicity 1706 based on the random time offset 1714, the likelihood of UEs bunching SPS scheduling within a small time window when a group of UEs encounters congestion (and, therefore, many of the UEs may change periodicities) is greatly reduced and/or eliminated, which leads to the more efficient use of network resources, improved latency, and better user experiences.

Figure 18:
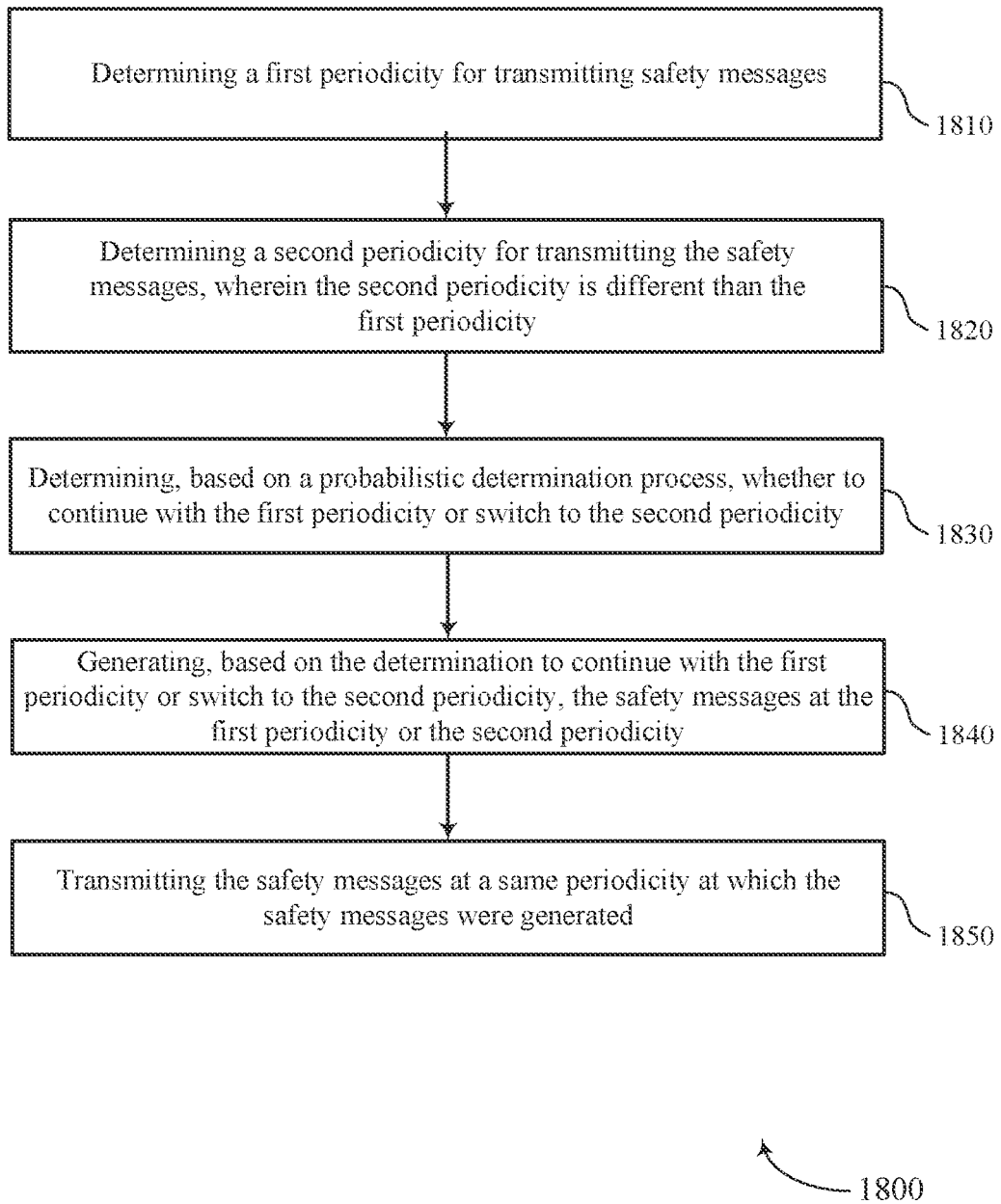
FIG. 18 is a flow diagram of a communication method according to some aspects of the present disclosure.

FIG. 18 is a flow diagram of a communication method 1800 in accordance with various aspects of the present disclosure. Aspects of the method 1800 can be executed by a computing device (e.g., a processor, processing circuit, and/or other suitable component) of an apparatus or other suitable means for performing the aspects. For example, a UE (e.g., UE 120 illustrated and described in connection with FIGS. 1 and 2, the UEs illustrated and described in connection with FIGS. 3, 4, 5, 6A-6C, 7, 9, and/or 10) may utilize one or more components (a receive processor (e.g., receive processor 258), a transmit processor (e.g., transmit processor 264), a controller/processor (e.g., controller/processor 280), a memory (e.g., memory 282), a modem (e.g., implemented by one or more of the receive processor, the transmit processor, the controller/processor, the memory, and/or antenna(s)), and/or the like) to execute aspects of method 1800. As illustrated, the method 1800 includes a number of enumerated aspects, but the method 1800 may include additional aspects before, after, and in between the enumerated aspects. For example, the method 1800 may employ similar mechanisms and aspects as described above with respect to FIGS. 3-17 and below with respect to FIG. 19. In some instances, one or more of the enumerated aspects may be omitted or performed in a different order.

At block 1810, the UE determines a first periodicity for transmitting safety messages. The first periodicity can be a supported semi-persistent scheduling (SPS) periodicity of a plurality of supported SPS periodicities (e.g., 20, 50, 100, 200, 300, 400, 500, 600, 700, 800, 900, 1000 ms or other suitable value). In this regard, the plurality of supported SPS periodicities may be defined by a specification (3gpp, SAE, etc.), the UE, or otherwise. For example, in some instances the plurality of supported SPS periodicities include SPS periodicities associated with Sidelink PC5 or LTE-V2X. In some instances, the processor, modem and/or other components of the UE may be programmed to facilitate the UE generating and/or transmitting safety messages using the plurality of supported SPS periodicities (or a subset thereof).

At block 1820, the UE determines a second periodicity for transmitting the safety messages. The second periodicity is different than the first periodicity determined at block 1810. The second periodicity can be a second supported SPS periodicity of the plurality of supported SPS periodicities (e.g., 20, 50, 100, 200, 300, 400, 500, 600, 700, 800, 900, 1000 ms or other suitable value).

In some instances, the UE determines the first periodicity and/or the second periodicity by rounding a calculated periodicity to the first or second periodicity. For example, the UE may round the calculated periodicity to at least one of a supported SPS periodicity of a specification or a multiple of a 100-millisecond periodicity. In some instances, the UE rounds a safety message generation periodicity determined by a congestion control algorithm to a supported SPS periodicity of the plurality of supported SPS periodicities. In this regard, the congestion control algorithm can be an SAE distributed congestion control (DCC) algorithm and the safety message generation periodicity can be a maximum inter-transmission time (MAX_ITT). In some instances, MAX_ITT is calculated as MAX_ITT=min (600 ms, max (100 ms, N/B*100 ms)), where 600 ms is the maximum allowed MAX_ITT, 100 ms is the minimum allowed MAX_ITT, N is the number of devices within a 100 m radius and B is a density factor with a default value of 25. In other instances, different values for the maximum, minimum, and density may be utilized.

In some instances, the UE determines the second periodicity by rounding a calculated periodicity to the second periodicity based on a hysteresis parameter (see, e.g., FIGS. 12A and 12B). In this regard, the hysteresis parameter may increase the range of calculated periodicities that will result in the UE rounding to the current periodicity (e.g., the first periodicity) and, therefore, maintaining the current periodicity. This can prevent a UE from attempting to repeatedly switch back and forth between two adjacent periodicities when the calculated periodicity value is near a rounding boundary of the adjacent periodicities and small changes in the environment and/or communications can potentially result in a different periodicity determination.

In some instances, the hysteresis parameter is a percentage of a gap between the first periodicity and an adjacent supported periodicity. For example, if the first periodicity is 300 ms and an adjacent supported periodicity is 400 ms (or 200 ms), then the gap is 100 ms. In some instances, the percentage is between 0% and 50%, including between 5% and 15%. In some instances, the UE randomly selects a value for the hysteresis parameter from a set of available values for the hysteresis parameter. In this regard, by having each UE randomly select a hysteresis parameter, the likelihood of a large number of UEs changing periodicities at the same time is reduced because the UEs will have different rounding ranges as a result of the different values of the hysteresis parameter from the random selections.

In some instances, the UE rounds the second calculated periodicity to the second periodicity based on determining whether the second calculated periodicity is less than $(T_n+T_{n-1})/2-(T_n-T_{n-1})*H$ or greater than $(T_n+T_{n+1})/2+(T_{n+1}-T_n)*H$, where $T_n$ is the current periodicity, $T_{n-1}$ is a supported periodicity less than the current periodicity, $T_{n+1}$ is a supported periodicity greater than the current periodicity, and H is the hysteresis parameter. In this regard, if the second calculated periodicity is less than less than (Tn+Tn−1)/2−(Tn−Tn−1)*H, then the UE rounds the second calculated periodicity to a lower periodicity value (e.g., Tn−1) than the current periodicity. Similarly, if the second calculated periodicity is greater than (Tn+Tn+1)/2+(Tn+1−Tn)*H, then the UE rounds the second calculated periodicity to a higher periodicity (e.g., Tn+1) than the current periodicity. If the second calculated periodicity is between (Tn+Tn−1)/2−(Tn−Tn−1)*H or greater than (Tn+Tn+1)/2+(Tn+1−Tn)*H, then the UE rounds the second calculated periodicity to the current periodicity and, therefore, the periodicity is not changed.

At block 1830, the UE determines whether to continue with the first periodicity or switch to the second periodicity. In some instances, the UE makes the determination whether to continue with the first periodicity or switch to the second periodicity based on a probabilistic determination process. The probabilistic determination process can include a weighted coin flip, probabilistic Boolean operation, or other suitable technique. In some instances, the probabilistic determination process is weighted towards the first periodicity. That is, the probabilistic determination process is biased towards maintaining the current periodicity instead of switching to a different periodicity. In this regard, in some instances the probabilistic determination process is weighted towards the first periodicity between 2:1 and 100:1, such as 5:1, 6:1, 7:1, 8:1, 9:1, 10:1, 15:1, 20:1, 25:1, 50:1, or other suitable value. In some instances, the UE determines whether to continue with the first periodicity or switch to the second periodicity at a scheduled packet generation time period associated with the first periodicity and prior to transmission of a packet generated at the scheduled packet generation time period.

At block 1840, the UE generates, based on the determination at block 1830 to continue with the first periodicity or switch to the second periodicity, the safety messages at the first periodicity or the second periodicity.

At block 1850, the UE transmits the safety messages at a same periodicity at which the safety messages were generated at block 1840. In some instances, a UE of the modem transmits the safety messages at the same periodicity at which the safety messages were generated by a safety program (e.g., ITS stack) of the UE. Accordingly, if the UE determines, at block 1830, to continue with the first periodicity and the safety messages are generated, at block 1840, at the first periodicity, then the modem can transmit the safety messages, at block 1850, at the first periodicity. Similarly, if the UE determines, at block 1830, to switch to the second periodicity and the safety messages are generated, at block 1840, at the second periodicity, then the modem can transmit the safety messages, at block 1850, at the second periodicity.

In some instances of the method 1800, the UE generates and/or transmits safety messages in a manner similar to the examples shown in FIGS. 3-6C, 10, and/or 13A-17.

In some instances of the method 1800, the UE requests, in response to determining to switch to the second periodicity at block 1830, a modem of the UE to change to the second periodicity prior to sending, to the modem, a last safety message packet generated at the first periodicity. Accordingly, in some instances the UE requests the modem to update the SPS periodicity prior to sending the first data packet generated at the updated SPS periodicity (e.g., the second SPS periodicity).

In some instances of the method 1800, the UE detects a tracking error and generates, based on the detected tracking error, a tracking error-based safety message separate from the SPS-scheduled safety messages. Accordingly, the tracking error-based safety message may be generated and/or transmitted separate from the plurality of supported SPS periodicities (see, e.g., FIGS. 13B and 13C). In some instances, the UE refrains from generating a safety message during a scheduled generation time period associated with the first periodicity or the second periodicity when the tracking error-based safety message is generated within a threshold amount of time of the scheduled generation time period (see, e.g., FIG. 13C). In some instances, the threshold amount of time is based on a packet delay budget (e.g., 50, 100, 200 ms or other suitable value) or other parameter. In some instances, the UE proceeds with generating a safety message during a scheduled generation time period even when the tracking error-based safety message is generated within the threshold amount of time of the scheduled generation time period if the scheduled generation time period is associated with a change in periodicity (e.g., from the first periodicity to the second periodicity).

In some instances of the method 1800, if the UE determines, at block 1830, to continue with the first periodicity, then the UE may determine a third periodicity for transmitting the safety messages, wherein the third periodicity is different than the first periodicity. The UE may determine, based on the probabilistic determination process, whether to continue with the first periodicity or switch to the third periodicity, and generate, based on the determination to continue with the first periodicity or switch to the third periodicity, the safety messages at the first periodicity or the third periodicity. In this regard, the third periodicity may be the same periodicity as the second periodicity that the UE did not switch to initially when the UE determined, at block 1830, to continue with the first periodicity.

Figure 19:
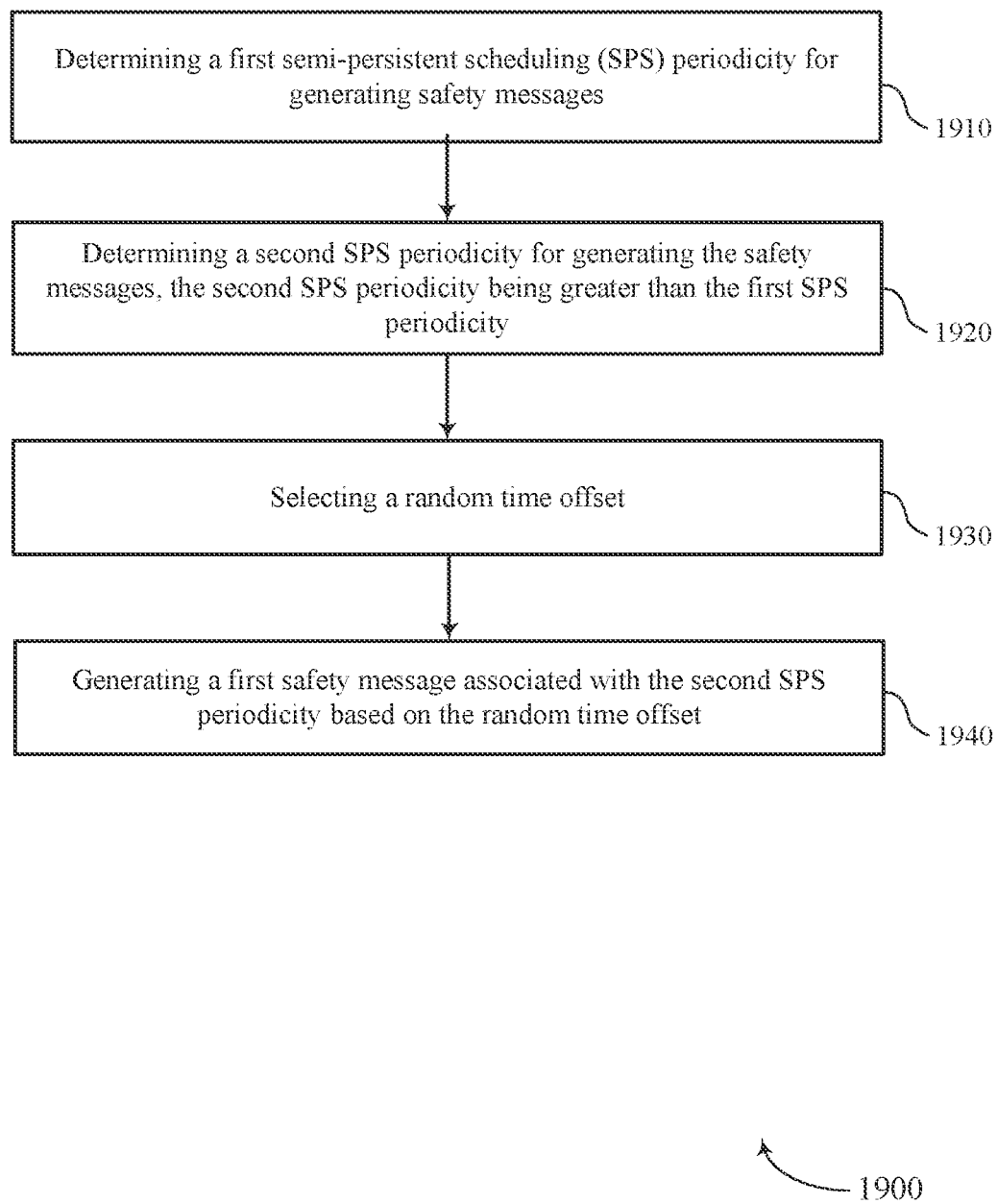
FIG. 19 is a flow diagram of a communication method according to some aspects of the present disclosure.

FIG. 19 is a flow diagram of a communication method 1900 in accordance with various aspects of the present disclosure. Aspects of the method 1900 can be executed by a computing device (e.g., a processor, processing circuit, and/or other suitable component) of an apparatus or other suitable means for performing the aspects. For example, a UE (e.g., UE 120 illustrated and described in connection with FIGS. 1 and 2, the UEs illustrated and described in connection with FIGS. 3, 4, 5, 6A-6C, 7, 9, and/or 10) may utilize one or more components (a receive processor (e.g., receive processor 258), a transmit processor (e.g., transmit processor 264), a controller/processor (e.g., controller/processor 280), a memory (e.g., memory 282), a modem (e.g., implemented by one or more of the receive processor, the transmit processor, the controller/processor, the memory, and/or antenna(s)), and/or the like) to execute aspects of method 1900. As illustrated, the method 1900 includes a number of enumerated aspects, but the method 1900 may include additional aspects before, after, and in between the enumerated aspects. For example, the method 1900 may employ similar mechanisms and aspects as described above with respect to FIGS. 3-18. In some instances, one or more of the enumerated aspects may be omitted or performed in a different order.

At block 1910, the UE determines a first semi-persistent scheduling (SPS) periodicity for generating safety messages. In some instances, at block 1910 the UE employs the same or similar aspects as block 1810 of method 1800 described above.

At block 1920, the UE determines a second SPS periodicity for generating the safety messages, the second SPS periodicity being greater than the first SPS periodicity. In some instances, at block 1920 the UE employs the same or similar aspects as block 1820 of method 1800 described above.

At block 1930, the UE selects a random time offset. In some instances, the UE selects a time offset from within a range or set of available time offsets. For example, in some instances the UE randomly selects a time offset between 0 and the second SPS periodicity.

At block 1940, the UE generates a first safety message associated with the second SPS periodicity based on the random time offset (see, e.g., FIG. 17). In some instances, the UE generates the first safety message after the random time offset from a current time. For example, if the random time offset is greater than or equal to a threshold value, then the UE can generate the first safety message after the random time offset from the current time. In some instances, the UE generates the first safety message after the second SPS periodicity from the current time. For example, if the random time offset is less than the threshold value, then the UE can generate the first safety message after the second SPS periodicity from the current time. In some instances, the threshold value is between 50 ms and 200 ms, including 100 ms. In some instances, the threshold value is a minimum allowed SPS periodicity. In some instances of the method 1900, the UE generates, following the first safety message, subsequent safety messages associated with the second SPS periodicity based on the second SPS periodicity (see, e.g., FIG. 17).

By having the UE select a random time offset and generate its first safety message of the updated periodicity based on the random time offset, the likelihood of UEs bunching SPS scheduling within a small time window when a group of UEs encounters congestion (and, therefore, many of the UEs may change periodicities) is greatly reduced and/or eliminated, which leads to the more efficient use of network resources, improved latency, and better user experiences.

By way of non-limiting examples, the following aspects are included in the present disclosure.

Aspect 1 includes a method of wireless communication performed by a user equipment (UE), the method comprising determining a first periodicity for transmitting safety messages; determining a second periodicity for transmitting the safety messages, wherein the second periodicity is different than the first periodicity; determining, based on a probabilistic determination process, whether to continue with the first periodicity or switch to the second periodicity; generating, based on the determination to continue with the first periodicity or switch to the second periodicity, the safety messages at the first periodicity or the second periodicity; and transmitting the safety messages at a same periodicity at which the safety messages were generated.

Aspect 2 includes the method of aspect 1, further comprising requesting, in response to determining to switch to the second periodicity, a modem of the user equipment to change to the second periodicity prior to sending, to the modem, a last safety message packet generated at the first periodicity.

Aspect 3 includes the method of any of aspects 1-2, wherein the first periodicity is a first supported semi-persistent scheduling (SPS) periodicity of a plurality of supported SPS periodicities; and the second periodicity is a second supported SPS periodicity of the plurality of supported SPS periodicities.

Aspect 4 includes the method of any of aspects 1-3, wherein the plurality of supported SPS periodicities include SPS periodicities associated with Sidelink PC5.

Aspect 5 includes the method of any of aspects 1-4, wherein at least one of the determining the first periodicity or the determining the second periodicity includes rounding a safety message generation periodicity determined by a congestion control algorithm to the first supported SPS periodicity or the second supported SPS periodicity.

Aspect 6 includes the method of any of aspects 1-5, wherein the congestion control algorithm is an SAE distributed congestion control algorithm and the safety message generation periodicity is a maximum inter-transmission time (MAX_ITT).

Aspect 7 includes the method of any of aspects 1-6, further comprising detecting a tracking error; and generating, based on the detected tracking error, a tracking error-based safety message separate from the plurality of supported SPS periodicities.

Aspect 8 includes the method of any of aspects 1-7, further comprising refraining from generating a safety message during a scheduled generation time period associated with the first periodicity or the second periodicity when the tracking error-based safety message is generated within a threshold amount of time of the scheduled generation time period.

Aspect 9 includes the method of any of aspects 1-8, wherein the threshold amount of time is based on a packet delay budget.

Aspect 10 includes the method of any of aspects 1-9, further comprising generating a safety message during a scheduled generation time period when the tracking error-based safety message is generated within a threshold amount of time of the scheduled generation time period and the scheduled generation time period is associated with a change in periodicity.

Aspect 11 includes the method of any of aspects 1-10, wherein the probabilistic determination process is weighted towards the first periodicity.

Aspect 12 includes the method of any of aspects 1-11, wherein the determining whether to continue with the first periodicity or switch to the second periodicity comprises determining to continue with the first periodicity; and the generating the safety messages at the first periodicity or the second periodicity comprises generating the safety messages at the first periodicity.

Aspect 13 includes the method of any of aspects 1-12, further comprising: determining a third periodicity for transmitting the safety messages, wherein the third periodicity is different than the first periodicity; determining, based on the probabilistic determination process, whether to continue with the first periodicity or switch to the third periodicity; and generating, based on the determination to continue with the first periodicity or switch to the third periodicity, the safety messages at the first periodicity or the third periodicity.

Aspect 14 includes the method of any of aspects 1-13, wherein the determining whether to continue with the first periodicity or switch to the second periodicity comprises determining to switch to the second periodicity; and the generating the safety messages using the first periodicity or the second periodicity comprises communicating the safety messages at the second periodicity.

Aspect 15 includes the method of any of aspects 1-14, wherein the determining the first periodicity for transmitting the safety messages comprises rounding a first calculated periodicity to the first periodicity.

Aspect 16 includes the method of any of aspects 1-15, wherein the rounding the first calculated periodicity to the first periodicity comprises rounding the first calculated periodicity to at least one of a supported SPS periodicity of a specification or a multiple of a 100-millisecond periodicity.

Aspect 17 includes the method of any of aspects 1-16, wherein the determining the second periodicity for transmitting the safety messages comprises rounding a second calculated periodicity to the second periodicity.

Aspect 18 includes the method of any of aspects 1-17, wherein the rounding the second calculated periodicity to the second periodicity comprises rounding the second calculated periodicity to the second periodicity based on a hysteresis parameter.

Aspect 19 includes the method of any of aspects 1-18, further comprising randomly selecting a value for the hysteresis parameter from a set of available values for the hysteresis parameter.

Aspect 20 includes the method of any of aspects 1-19, wherein the hysteresis parameter is a percentage of a gap between the first periodicity and an adjacent supported periodicity.

Aspect 21 includes the method of any of aspects 1-20, wherein the rounding the second calculated periodicity to the second periodicity based on a hysteresis parameter comprises determining the second calculated periodicity is less than (Tn+Tn−1)/2−(Tn−Tn−1)*H or greater than (Tn+Tn+1)/2+(Tn+1−Tn)*H, where Tn is the first periodicity, Tn−1 is a supported periodicity less than the first periodicity, Tn+1 is a supported periodicity greater than the first periodicity, and H is the hysteresis parameter.

Aspect 22 includes the method of any of aspects 1-21, wherein the determining whether to continue with the first periodicity or switch to the second periodicity occurs at a scheduled packet generation time period associated with the first periodicity and prior to transmission of a packet generated at the scheduled packet generation time period.

Aspect 23 includes the method of any of aspects 1-22, wherein the probabilistic determination process is weighted towards the first periodicity between 5:1 and 10:1.

Aspect 24 includes the method of any of aspects 1-23, wherein the percentage is between 5% and 15%.

Aspect 25 includes a method of wireless communication performed by a user equipment, the method comprising determining a first semi-persistent scheduling (SPS) periodicity for generating safety messages; determining a second SPS periodicity for generating the safety messages, the second SPS periodicity being greater than the first SPS periodicity; selecting a random time offset; and generating a first safety message associated with the second SPS periodicity based on the random time offset.

Aspect 26 includes the method of aspect 25, wherein the selecting the random time offset comprises randomly selecting a time between 0 and the second SPS periodicity.

Aspect 27 includes the method of any of aspects 25-26, wherein the generating the first safety message associated with the second SPS periodicity comprises generating the first safety message after the random time offset from a current time if the random time offset is greater than or equal to a threshold value.

Aspect 28 includes the method of any of aspects 25-27, wherein the generating the first safety message associated with the second SPS periodicity comprises generating the first safety message after the second SPS periodicity from the current time if the random time offset is less than the threshold value.

Aspect 29 includes the method of any of aspects 25-28, further comprising generating, following the first safety message, subsequent safety messages associated with the second SPS periodicity based on the second SPS periodicity.

Aspect 30 includes the method of any of aspects 25-29, wherein the threshold value is 100 ms.

Aspect 31 includes a user equipment (UE) comprising a transceiver, a memory, and a processor coupled to the transceiver and the memory, the UE configured to determine a first periodicity for transmitting safety messages; determine a second periodicity for transmitting the safety messages, wherein the second periodicity is different than the first periodicity; 0 determine, based on a probabilistic determination process, whether to continue with the first periodicity or switch to the second periodicity; and generate, based on the determination to continue with the first periodicity or switch to the second periodicity, the safety messages at the first periodicity or the second periodicity; and a modem in communication with the processor, the modem configured to: transmit the safety messages at a same periodicity at which the safety messages were generated.

Aspect 32 includes a user equipment (UE) of aspect 31, the first periodicity is a first supported semi-persistent scheduling (SPS) periodicity of a plurality of supported SPS periodicities; the plurality of supported SPS periodicities include SPS periodicities associated with Sidelink PC5; the second periodicity is a second supported SPS periodicity of the plurality of supported SPS periodicities; and the processor is further configured to detect a tracking error; generate, based on the detected tracking error, a tracking error-based safety message separate from the plurality of supported SPS periodicities; request, in response to determining to switch to the second periodicity, the modem to change to the second periodicity prior to sending a last safety message packet generated at the first periodicity to the modem; and determine at least one of the first periodicity or the second periodicity by rounding a safety message generation periodicity determined by a congestion control algorithm executed by the processor to the first supported SPS periodicity or the second supported SPS periodicity.

Aspect 33 includes a user equipment (UE) comprising a transceiver, a memory, and a processor coupled to the transceiver and the memory, the UE configured to determine a first semi-persistent scheduling (SPS) periodicity for generating safety messages; determine a second SPS periodicity for generating the safety messages, the second SPS periodicity being greater than the first SPS periodicity; select a random time offset; and generate a first safety message associated with the second SPS periodicity based on the random time offset.

Aspect 34 includes a base station (BS) comprising a transceiver, a memory, and a processor coupled to the transceiver and the memory, the BS configured to perform any one of aspects 1-33.

Aspect 35 includes a non-transitory computer-readable medium storing one or more instructions for wireless communication, the one or more instructions comprising one or more instructions that, when executed by one or more processors of a user equipment, cause the one or more processors to perform any one of aspects 1-25.

Aspect 36 includes a non-transitory computer-readable medium storing one or more instructions for wireless communication, the one or more instructions comprising one or more instructions that, when executed by one or more processors of a user equipment, cause the one or more processors to perform any one of aspects 25-30.

Aspect 37 includes a non-transitory computer-readable medium storing one or more instructions for wireless communication, the one or more instructions comprising one or more instructions that, when executed by one or more processors of a base station, cause the one or more processors to perform any one of aspects 1-33.

Aspect 38 includes a user equipment (UE) comprising means to perform any one of aspects 1-25.

Aspect 39 includes a user equipment (UE) comprising means to perform any one of aspects 25-30.

Aspect 40 includes a base station (BS) comprising means to perform any one of aspects 1-33.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, the method comprising:
   determining, based on at least a distributed congestion control algorithm, a first periodicity for transmitting safety messages;
   determining, based on at least the distributed congestion control algorithm, a second periodicity for transmitting the safety messages, wherein the second periodicity is different than the first periodicity;
   determining, based on a probabilistic determination process, whether to continue with the first periodicity or switch to the second periodicity;
   generating, based on the determination to continue with the first periodicity or switch to the second periodicity, the safety messages at the first periodicity or the second periodicity; and
   transmitting the safety messages at a same periodicity at which the safety messages were generated.

2. The method of claim 1, further comprising:
   requesting, in response to determining to switch to the second periodicity, a modem of the user equipment to change to the second periodicity prior to sending, to the modem, a last safety message packet generated at the first periodicity.

3. The method of claim 1, wherein:
   the first periodicity is a first supported semi-persistent scheduling (SPS) periodicity of a plurality of supported SPS periodicities; and
   the second periodicity is a second supported SPS periodicity of the plurality of supported SPS periodicities.

4. The method of claim 3, wherein the plurality of supported SPS periodicities include SPS periodicities associated with Sidelink PC5.

5. The method of claim 3, wherein at least one of the determining the first periodicity or the determining the second periodicity includes rounding a safety message generation periodicity determined by the distributed congestion control algorithm to the first supported SPS periodicity or the second supported SPS periodicity.

6. The method of claim 5, wherein the distributed congestion control algorithm is an SAE distributed congestion control algorithm and the safety message generation periodicity is a maximum inter-transmission time (MAX_ITT).

7. The method of claim 3, further comprising:
   detecting a tracking error; and
   generating, based on the detected tracking error, a tracking error-based safety message separate from the plurality of supported SPS periodicities.

8. The method of claim 7, further comprising:
   refraining from generating a safety message during a scheduled generation time period associated with the first periodicity or the second periodicity when the tracking error-based safety message is generated within a threshold amount of time of the scheduled generation time period.

9. The method of claim 8, wherein the threshold amount of time is based on a packet delay budget.

10. The method of claim 7, further comprising:
    generating a safety message during a scheduled generation time period when the tracking error-based safety message is generated within a threshold amount of time of the scheduled generation time period and the scheduled generation time period is associated with a change in the first periodicity or a change in the second periodicity.

11. The method of claim 1, wherein the probabilistic determination process is weighted towards the first periodicity.

12. The method of claim 1, wherein:
the determining whether to continue with the first periodicity or switch to the second periodicity comprises determining to continue with the first periodicity; and
the generating the safety messages at the first periodicity or the second periodicity comprises generating the safety messages at the first periodicity.

13. The method of claim 12, further comprising:
determining a third periodicity for transmitting the safety messages, wherein the third periodicity is different than the first periodicity;
determining, based on the probabilistic determination process, whether to continue with the first periodicity or switch to the third periodicity; and
generating, based on the determination to continue with the first periodicity or switch to the third periodicity, the safety messages at the first periodicity or the third periodicity.

14. The method of claim 1, wherein:
the determining whether to continue with the first periodicity or switch to the second periodicity comprises determining to switch to the second periodicity; and
the generating the safety messages using the first periodicity or the second periodicity comprises communicating the safety messages at the second periodicity.

15. The method of claim 1, wherein the determining the first periodicity for transmitting the safety messages comprises:
rounding a first calculated periodicity to the first periodicity.

16. The method of claim 15, wherein the rounding the first calculated periodicity to the first periodicity comprises rounding the first calculated periodicity to at least one of a supported SPS periodicity of a specification or a multiple of a 100-millisecond periodicity.

17. The method of claim 15, wherein the determining the second periodicity for transmitting the safety messages comprises:
rounding a second calculated periodicity to the second periodicity.

18. The method of claim 17, wherein the rounding the second calculated periodicity to the second periodicity comprises rounding the second calculated periodicity to the second periodicity based on a hysteresis parameter.

19. The method of claim 18, further comprising:
randomly selecting a value for the hysteresis parameter from a set of available values for the hysteresis parameter.

20. The method of claim 18, wherein the hysteresis parameter is a percentage of a gap between the first periodicity and an adjacent supported periodicity.

21. The method of claim 18, wherein the rounding the second calculated periodicity to the second periodicity based on a hysteresis parameter comprises:
determining the second calculated periodicity is
less than $(T_n+T_{n-1})/2-(T_n-T_{n-1})*H$ or
greater than $(T_n+T_{n+1})/2+(T_{n+1}-T_n)*H$,
where $T_n$ is the first periodicity, $T_{n-1}$ is a supported periodicity less than the first periodicity, $T_{n+1}$ is a supported periodicity greater than the first periodicity, and H is the hysteresis parameter.

22. The method of claim 1, wherein the determining whether to continue with the first periodicity or switch to the second periodicity occurs at a scheduled packet generation time period associated with the first periodicity and prior to transmission of a packet generated at the scheduled packet generation time period.

23. A method of wireless communication performed by a user equipment, the method comprising:
determining, based on at least a distributed congestion control algorithm, a first semi-persistent scheduling (SPS) periodicity for generating safety messages;
determining, based on at least the distributed congestion control algorithm, a second SPS periodicity for generating the safety messages, the second SPS periodicity being greater than the first SPS periodicity;
selecting a random time offset; and
generating a first safety message associated with the second SPS periodicity based on the random time offset.

24. The method of claim 23, wherein the selecting the random time offset comprises:
randomly selecting a time between 0 and the second SPS periodicity.

25. The method of claim 24, wherein the generating the first safety message associated with the second SPS periodicity comprises:
generating the first safety message after the random time offset from a current time based on the random time offset being greater than or equal to a threshold value.

26. The method of claim 25, wherein the generating the first safety message associated with the second SPS periodicity comprises:
generating the first safety message after the second SPS periodicity from the current time based on the random time offset being less than the threshold value.

27. The method of claim 26, further comprising:
generating, following the first safety message, subsequent safety messages associated with the second SPS periodicity based on the second SPS periodicity.

28. A user equipment, comprising:
a processor configured to:
determine, based on at least a distributed congestion control algorithm, a first periodicity for transmitting safety messages;
determine, based on at least the distributed congestion control algorithm, a second periodicity for transmitting the safety messages, wherein the second periodicity is different than the first periodicity;
determine, based on a probabilistic determination process, whether to continue with the first periodicity or switch to the second periodicity; and
generate, based on the determination to continue with the first periodicity or switch to the second periodicity, the safety messages at the first periodicity or the second periodicity; and
a modem in communication with the processor, the modem configured to:
transmit the safety messages at a same periodicity at which the safety messages were generated.

29. The user equipment of claim 28, wherein:
the first periodicity is a first supported semi-persistent scheduling (SPS) periodicity of a plurality of supported SPS periodicities;
the plurality of supported SPS periodicities include SPS periodicities associated with Sidelink PC5;
the second periodicity is a second supported SPS periodicity of the plurality of supported SPS periodicities; and the processor is further configured to:
- detect a tracking error;
- generate, based on the detected tracking error, a tracking error-based safety message separate from the plurality of supported SPS periodicities;
- request, in response to determining to switch to the second periodicity, the modem to change to the second periodicity prior to sending a last safety message packet generated at the first periodicity to the modem; and
- determine at least one of the first periodicity or the second periodicity by rounding a safety message generation periodicity determined by the distributed congestion control algorithm executed by the processor to the first supported SPS periodicity or the second supported SPS periodicity.

30. A user equipment, comprising:
a processor configured to:
determine, based on at least a distributed congestion control algorithm, a first semi-persistent scheduling (SPS) periodicity for generating safety messages;
determine, based on at least the distributed congestion control algorithm, a second SPS periodicity for generating the safety messages, the second SPS periodicity being greater than the first SPS periodicity;
select a random time offset; and
generate a first safety message associated with the second SPS periodicity based on the random time offset.

* * * * *